(12) United States Patent
des Roziers et al.

(10) Patent No.: US 11,676,090 B2
(45) Date of Patent: Jun. 13, 2023

(54) ENHANCED MULTI-COMPONENT OBJECT-BASED DESIGN, COMPUTATION, AND EVALUATION

(71) Applicant: Model N, Inc., San Mateo, CA (US)

(72) Inventors: Eric Burin des Roziers, Montpellier (FR); Fan Fan, Saratoga, CA (US); Jean-Baptiste Pringuey, San Francisco, CA (US); Naveen Uttamsingh, Santa Clara, CA (US); Gregory Zussa, San Francisco, CA (US); John Ellithorpe, Redwood City, CA (US)

(73) Assignee: Model N, Inc., San Mateo, CA (US)

( * ) Notice: Subject to any disclaimer, the term of this patent is extended or adjusted under 35 U.S.C. 154(b) by 0 days.

(21) Appl. No.: 16/160,927

(22) Filed: Oct. 15, 2018

(65) Prior Publication Data
US 2019/0050777 A1    Feb. 14, 2019

Related U.S. Application Data

(63) Continuation of application No. 13/621,368, filed on Sep. 17, 2012, now abandoned.
(Continued)

(51) Int. Cl.
*G06Q 10/06*    (2023.01)
*G06Q 10/0637*    (2023.01)

(52) U.S. Cl.
CPC ... *G06Q 10/06375* (2013.01); *G06Q 10/0637* (2013.01)

(58) Field of Classification Search
None
See application file for complete search history.

(56) References Cited

U.S. PATENT DOCUMENTS 5,515,269 A    5/1996    Willis et al.
5,515,524 A    5/1996    Lynch et al.
(Continued)

OTHER PUBLICATIONS

Sebastian Burckhardt, Daan Leijen, Caitlin Sadowski, Jaeheon Yi, and Thomas Ball. 2011. Two for the price of one: a model for parallel and incremental computation. SIGPLAN Not. 46, 10 (Oct. 2011), 427-144 (Year: 2011).*
(Continued)

*Primary Examiner* — Darlene Garcia-Guerra
(74) *Attorney, Agent, or Firm* — Patent Law Works LLP

(57) ABSTRACT

In an example, a method comprises defining an object comprising a plurality of discrete components, each of which comprises a set of discrete formulas having a predefined order. The method initiates an evaluation of each discrete component by looping over each formula of that discrete component to produce a result set according to the predefined order by evaluating without specifying a dimensionality to produce the result set with a single row, or evaluating the formula with a specified dimensionality to produce the result set with a plurality of rows. The method displays a calculation user interface, determines that an action exists that is associated with at least one formula of at least one discrete component, displays a user-selectable element corresponding to the action, and automatically pauses computation of at least a portion of the evaluation until input selecting the user-selectable element is received.

22 Claims, 18 Drawing Sheets

Related U.S. Application Data

(60) Provisional application No. 61/564,804, filed on Nov. 29, 2011.

(56) References Cited

U.S. PATENT DOCUMENTS

| | | | |
|---|---|---|---|
| 5,576,965 | A | 11/1996 | Akasaka et al. |
| 5,617,514 | A | 4/1997 | Dolby et al. |
| 5,630,025 | A | 5/1997 | Dolby et al. |
| 5,708,798 | A | 1/1998 | Lynch et al. |
| 5,809,133 | A * | 9/1998 | Bartkowiak ............ H04L 27/30 379/282 |
| 6,002,854 | A | 12/1999 | Lynch et al. |
| 6,035,305 | A | 3/2000 | Strevey et al. |
| 6,115,547 | A | 9/2000 | Ghatate et al. |
| 6,144,930 | A | 11/2000 | Kinzelman |
| 6,161,051 | A | 12/2000 | Hafemann et al. |
| 6,188,977 | B1 | 2/2001 | Hirota |
| 6,219,659 | B1 | 4/2001 | Kliorin |
| 6,233,493 | B1 | 5/2001 | Cherneff et al. |
| 6,424,989 | B1 * | 7/2002 | Shaw ...................... G06F 9/465 348/E5.108 |
| 6,430,730 | B1 | 8/2002 | Ghatate et al. |
| 6,442,537 | B1 | 8/2002 | Karch |
| 6,694,359 | B1 * | 2/2004 | Morris ..................... G06F 8/60 709/219 |
| 6,820,073 | B1 * | 11/2004 | Bedell .................... G06F 16/20 707/754 |
| 6,856,980 | B2 | 2/2005 | Feldman et al. |
| 6,865,524 | B1 | 3/2005 | Shah et al. |
| 6,915,253 | B1 | 7/2005 | Chapman |
| 7,043,407 | B2 | 5/2006 | Lynch et al. |
| 7,080,142 | B2 | 7/2006 | Galloway et al. |
| 7,188,335 | B1 | 3/2007 | Darr et al. |
| 7,200,583 | B1 | 4/2007 | Shah et al. |
| 7,340,406 | B1 | 3/2008 | Tribble |
| 7,340,409 | B1 | 3/2008 | Ulwick |
| 7,401,061 | B2 | 7/2008 | Law |
| 7,433,748 | B2 | 10/2008 | Selway |
| 7,441,230 | B2 * | 10/2008 | Kainz ..................... G06T 17/005 345/440 |
| 7,483,869 | B2 | 1/2009 | Kumar |
| 7,603,358 | B1 | 10/2009 | Anderson et al. |
| 7,669,133 | B2 | 2/2010 | Chikirivao et al. |
| 7,676,387 | B2 | 3/2010 | Childress et al. |
| 7,735,062 | B2 | 6/2010 | de Seabra e Melo et al. |
| 7,783,528 | B2 | 8/2010 | Musgrove et al. |
| 7,930,922 | B2 * | 4/2011 | Onishi .................... F01N 9/002 73/23.31 |
| 7,949,738 | B2 | 5/2011 | Kumar |
| 7,970,724 | B1 | 6/2011 | Hauser |
| 8,160,990 | B2 | 4/2012 | Varmaraja et al. |
| 8,230,390 | B2 | 7/2012 | Koster |
| 8,682,773 | B1 | 3/2014 | Murphy et al. |
| 8,943,003 | B2 | 1/2015 | Ardoint et al. |
| 9,495,691 | B1 * | 11/2016 | Dong ............... G06Q 30/0207 |
| 9,652,584 | B2 | 5/2017 | Hansen et al. |
| 2001/0025264 | A1 | 9/2001 | Deaddio et al. |
| 2001/0047299 | A1 * | 11/2001 | Brewer .............. G06Q 30/0211 705/14.13 |
| 2002/0035463 | A1 | 3/2002 | Lynch et al. |
| 2002/0052778 | A1 * | 5/2002 | Murphy ................ G06Q 30/02 705/14.66 |
| 2002/0072956 | A1 | 6/2002 | Willems et al. |
| 2002/0111891 | A1 | 8/2002 | Hoffman et al. |
| 2002/0120917 | A1 | 8/2002 | Abrari et al. |
| 2002/0154114 | A1 | 10/2002 | Christensen et al. |
| 2002/0169658 | A1 | 11/2002 | Adler |
| 2002/0198856 | A1 | 12/2002 | Feldman et al. |
| 2003/0018486 | A1 | 1/2003 | Feldman et al. |
| 2003/0033240 | A1 | 2/2003 | Balson et al. |
| 2003/0126250 | A1 | 7/2003 | Jhanji |
| 2003/0130852 | A1 * | 7/2003 | Tanaka ................... H04M 1/05 704/275 |
| 2003/0158759 | A1 | 8/2003 | Kannenberg |
| 2003/0212584 | A1 | 11/2003 | Flores |
| 2003/0216969 | A1 * | 11/2003 | Bauer ..................... H01Q 7/00 705/22 |
| 2004/0009813 | A1 | 1/2004 | Wind |
| 2004/0024635 | A1 | 2/2004 | McClure et al. |
| 2004/0059808 | A1 | 3/2004 | Galloway et al. |
| 2004/0078796 | A1 | 4/2004 | Utsumi |
| 2004/0088195 | A1 | 5/2004 | Childress et al. |
| 2004/0088199 | A1 | 5/2004 | Childress et al. |
| 2004/0122747 | A1 | 6/2004 | Jimenez et al. |
| 2004/0128117 | A1 | 7/2004 | Crandall et al. |
| 2004/0181441 | A1 | 9/2004 | Fung et al. |
| 2005/0090911 | A1 | 4/2005 | Ingargiola et al. |
| 2005/0096950 | A1 | 5/2005 | Caplan et al. |
| 2005/0097146 | A1 | 5/2005 | Konstantinou et al. |
| 2005/0102249 | A1 | 5/2005 | Bigus |
| 2005/0182693 | A1 | 8/2005 | Alivandi |
| 2005/0183025 | A1 | 8/2005 | Kumar |
| 2005/0222996 | A1 | 10/2005 | Yalamanchi |
| 2005/0263594 | A1 | 12/2005 | Onischu |
| 2006/0069892 | A1 | 3/2006 | Nakanishi et al. |
| 2006/0100829 | A1 | 5/2006 | Lynch et al. |
| 2006/0129978 | A1 | 6/2006 | Abrari et al. |
| 2006/0167577 | A1 | 7/2006 | Clark et al. |
| 2006/0168573 | A1 | 7/2006 | Clark et al. |
| 2006/0282458 | A1 | 12/2006 | Tsyganskiy et al. |
| 2006/0294058 | A1 * | 12/2006 | Zabback ............. G06F 16/2462 |
| 2007/0094060 | A1 | 4/2007 | Apps et al. |
| 2007/0213968 | A1 | 9/2007 | Nakagawa et al. |
| 2007/0260667 | A1 * | 11/2007 | Duzak ................... G06F 9/5066 708/521 |
| 2008/0040682 | A1 | 2/2008 | Sorenson et al. |
| 2008/0059273 | A1 | 3/2008 | Miller |
| 2008/0082569 | A1 * | 4/2008 | Mansour ................ G06Q 10/10 |
| 2008/0104015 | A1 * | 5/2008 | Burger ............... G06F 16/2456 |
| 2008/0163101 | A1 | 7/2008 | Rimas-Ribikauskas et al. |
| 2008/0196002 | A1 | 8/2008 | Koster |
| 2008/0208923 | A1 * | 8/2008 | Watanabe ........... G06F 11/1004 |
| 2008/0216148 | A1 | 12/2008 | Bienek et al. |
| 2009/0006301 | A1 | 1/2009 | Goetsch et al. |
| 2009/0018996 | A1 * | 1/2009 | Hunt ..................... G06Q 30/02 |
| 2009/0248597 | A1 | 10/2009 | Fickie et al. |
| 2009/0287617 | A1 | 11/2009 | Schmidt |
| 2009/0300419 | A1 * | 12/2009 | Silverman ........... G06F 11/2294 714/30 |
| 2009/0313508 | A1 | 12/2009 | Yan et al. |
| 2010/0121795 | A1 | 5/2010 | Colena et al. |
| 2010/0161360 | A1 | 6/2010 | Clement et al. |
| 2010/0262443 | A1 | 10/2010 | D'Albis et al. |
| 2011/0087689 | A1 | 4/2011 | Ziegler |
| 2011/0173050 | A1 | 7/2011 | Heyns et al. |
| 2011/0191263 | A1 | 8/2011 | Torre et al. |
| 2011/0252163 | A1 | 10/2011 | Villar et al. |
| 2011/0264490 | A1 * | 10/2011 | Durvasula ........... G06Q 30/0234 705/14.1 |
| 2011/0301926 | A1 | 12/2011 | Chussil |
| 2012/0005144 | A1 | 1/2012 | Cutler et al. |
| 2012/0054225 | A1 * | 3/2012 | Marwah .............. G06F 16/2453 707/769 |
| 2012/0166459 | A1 | 6/2012 | Ritter et al. |
| 2012/0198368 | A1 | 8/2012 | Bornheimer et al. |
| 2012/0278213 | A1 * | 11/2012 | Bristow ................ G06Q 40/00 705/32 |
| 2013/0080239 | A1 * | 3/2013 | Okerlund ............ G06Q 20/387 705/14.27 |
| 2013/0110473 | A1 | 5/2013 | Cantu |
| 2014/0032482 | A1 | 1/2014 | Dulaney et al. |
| 2014/0075004 | A1 | 3/2014 | Van Dusen et al. |
| 2014/0096041 | A1 | 4/2014 | Gowen et al. |
| 2016/0094243 | A1 * | 3/2016 | Ackerman ........... G06F 16/2456 341/51 |
| 2017/0235848 | A1 | 8/2017 | Van Dusen et al. |

OTHER PUBLICATIONS

Teng, Lefa. "A comparison of two types of price discounts in shifting consumers' attitudes and purchase intentions." Journal of business research 62.1 (2009): 14-21 (Year: 2009).*

(56) References Cited

OTHER PUBLICATIONS

Casadesus-Masanell, Ramon, and Joan Enric Ricart. "From strategy to business models and onto tactics." Long range planning 43.2-3 (2010): 195-215 (Year: 2010).*

European Office Action for Application No. 14197988.0 dated Mar. 26, 2018, 8 pages.

International Search Report and Written Opinion for PCT/US2013/077214, dated Apr. 28, 2014 (15 pages).

Kamis, Arnold, et al., "A Flow-Based Model of Web Site Intentions When Users Customize Products in Business-to-Consumer Electronic Commerce", Information Systems Frontiers, 12(2), Published online Aug. 5, 2008, pp. 157-168.

Xie, Helen et al., "A Constraint-Based Product Configurator for Mass Customisation", Int. J. Computer Applications in Technology, vol. 26, Nos. 1/2, 2006, 9 pgs.

\* cited by examiner

Structures in a Component Instance

| Formula | |
|---|---|
| Variable | Formula |
| myVar | Percent*TotalAmount |

Formula in a Component Instance

ENHANCED MULTI-COMPONENT OBJECT-BASED DESIGN, COMPUTATION, AND EVALUATION

CROSS REFERENCE TO RELATED APPLICATIONS

The present application is a continuation of and claims the benefit of priority under 35 U.S.C. § 120 to U.S. patent application Ser. No. 13/621,368, filed on Sep. 17, 2012, which claims the benefit of priority under 35 U.S.C. § 119(e) to U.S. Provisional Application No. 61/564,804, filed on Nov. 29, 2011, the entire contents of each of which are incorporated by reference herein.

BACKGROUND

The present disclosure relates to management of business processes including modeling and simulation of real-time operations for businesses. In particular, the present disclosure relates to systems and methods for formulating and executing business strategies based on data derived from historical operations, other considerations, and pre-defined criteria for a particular business of interest. The invention relates to a business strategy designer that is flexible, scalable, and configured to formulate a business strategy and has the ability to execute the formulated business strategy.

In business-to-business relationships, there are complex terms and conditions that typically govern how trading partners typically conduct business transactions. For example, to receive discounts on the prices of goods purchased, buyers may sign a contract where they need to satisfy commitments to purchase a given amount of goods over a period of time. Real world business relationships typically leverage multiple, complex conditions on a variety of incentive techniques, such as, performance-based rebates. In order to maximize the value of a business, increase revenue, and reduce cost, a business entity often defines sophisticated business strategies that examine a trading partner's performance and places careful controls on the pricing and benefits. In order to implement these types of business strategies, a business faces many challenges. A business typically needs to formulate strategies that can be used in a specific trading partner relationship. A business must be able to efficiently access the necessary data, such as sale transactions, products, and customers. A business must be able to subdivide the data to provide the appropriate data set to the various implemented business strategies. And, for each implemented strategy, a business must perform calculations based on a business strategy definition. Finally, since trading partner relationships may change and evolve over time, a business must ensure that the calculations are always correct and based on the appropriate version of the strategy associated with that trading partner.

It is important for businesses that require complex commercial terms to be able to implement and execute these types of business strategies, as they are effective tools in achieving both top and bottom line business goals, such as increasing market share, revenue, or margin. Moreover, since businesses must typically respond to their trading partners in a timely fashion, an efficient process is required to ensure that only accurate and complete transaction details are provided to their trading partners. Businesses rely on these processes to ensure revenue integrity, stem revenue loss, reduce cost, and improve satisfaction with the trading partners. Finally, businesses must conduct their processes ensuring controls and auditability, so they can comply with government regulations, such as the Sarbanes-Oxley Act.

Traditionally, businesses address these mammoth challenges by using a variety of point software solutions that address only parts of the process. Businesses often use a mix of commercial software or homegrown tools built on top of generalized tools, such as spreadsheets or databases. These tools focus on predefined solutions that have limited flexibility, as they are not designed to adapt to the changes in the business strategies or handle the scope of the business.

SUMMARY

The present disclosure overcomes the deficiencies of the prior art by providing a system and method where users can define and implement business strategies that are flexible, accurate, and auditable.

In one embodiment of the present invention, a business user creates a new business strategy consisting of strategy components that are bound together through an orchestrator component that is responsible for coordinating the logic of the calculations for the new business strategy. A component may be composed of any number of filters, structures, and formulas. Filters define what data is required to be brought into the calculation for that component. Structures provide a way to store and manage data within a component, such as user inputs or intermediate results. Formulas are expressions that define the calculations that are performed by each component. During the construction process of the strategy, the business user is able to execute the strategy in a "test" mode to ensure the correctness of the definition. The business can activate the newly created strategy to make it available for use by other users.

A strategy may reference data elements within a "data tracker" that provides a means for managing data inputs within a calculation. For example, a business may have multiple different strategies that depend on whether the customer has a "bronze", "silver", or "gold" status. The data tracker can be used to store the customer status that can then be referenced by the strategies. Using the data tracker method allows strategies to be defined in a reusable manner.

To use a strategy, a business user creates an instance of the strategy, in which, the user can fill in the specifics for that usage of the strategy. For example, to use a revenue-based percentage rebate incentive, the user would need to configure the strategy to indicate the duration of the incentive, what products are included, what rebate percentage is achieved by what revenue achievement, and so on. Once the strategy has been configured correctly, the strategy is implemented; whereby, the system prepares to run the calculations based on the availability of data in the system. For example, a one year rebate incentive with quarterly payments would create four calculation periods, one for each quarter in the year.

For implemented strategies, the calculations may be triggered automatically or manually. As data is loaded into the system, the system may detect newly available data and initiate the calculation automatically. Alternatively, the business user may explicitly trigger the calculation if they require the most up-to-date data in the system. The business user may review the results of the calculation at any time.

BRIEF DESCRIPTION OF THE DRAWINGS

The present disclosure is illustrated by way of example, and not by way of limitation, in the figures of the accompanying drawings, in which like reference numerals are used to refer to similar elements.

FIG. 4B-1 is a block diagram illustrating an example composition of a component and strategy.

FIG. 4B-2 is a table illustrating an example strategy parameterization mechanism, in particular, example structures in a component instance, and an example formula in a component instance

Figure 1:
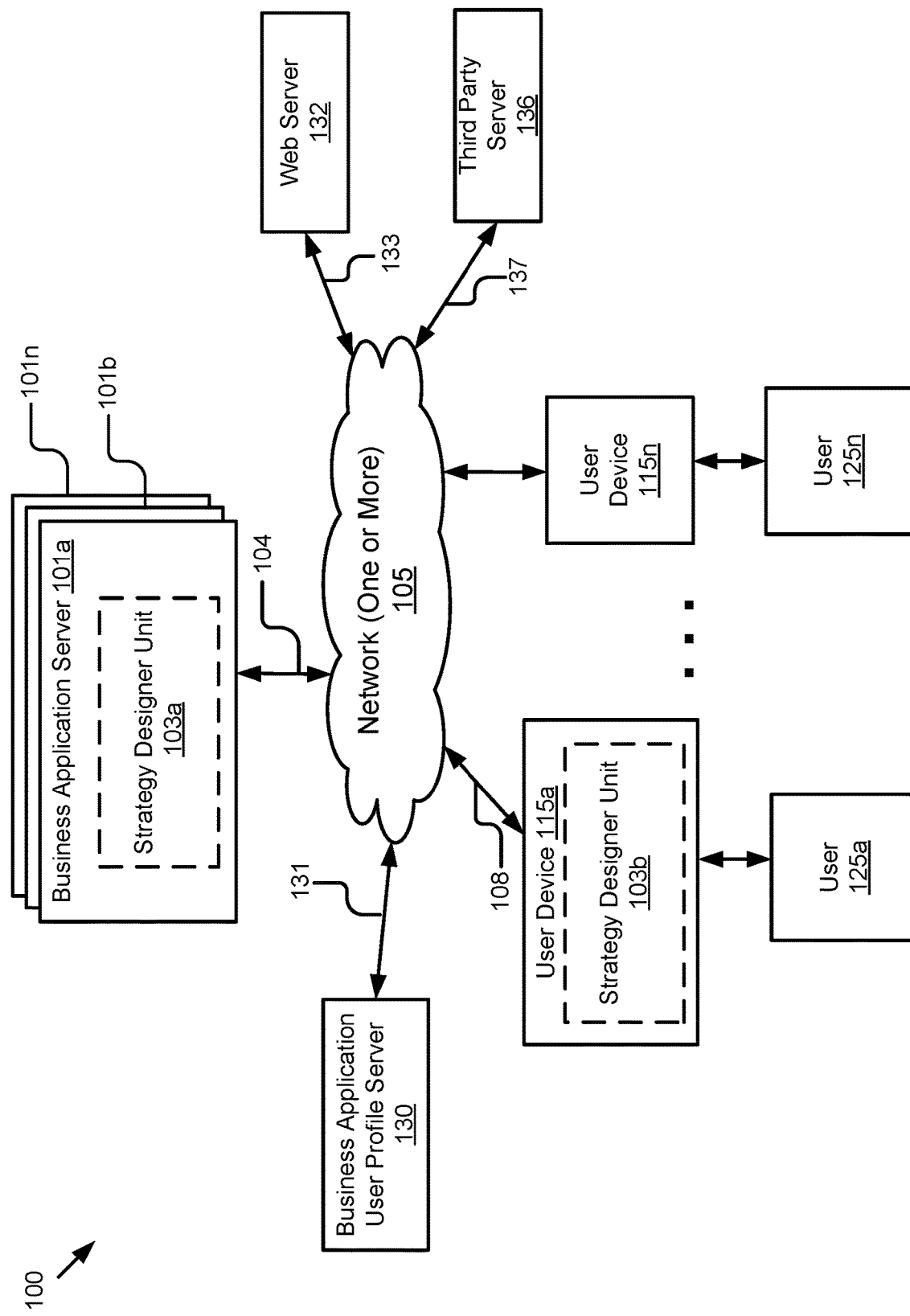
FIG. 1 is a high-level block diagram illustrating some embodiments of the systems including a strategy designer unit configured in a distributed architecture, a portion or all of the strategy designer module located in one or more business application servers and user devices; the strategy designer unit configured to formulate an overall or partial strategy for a particular business of interest and model and/or simulate real-time operations of the particular business of interest.

The figures depict various embodiments of the present invention for purposes of illustration only. One skilled in the art should readily recognize from the following discussion that alternative embodiments of the structures and methods illustrated herein may be employed without departing from the principles of the invention described herein.

DETAILED DESCRIPTION

The specification describes systems and methods for providing flexible and scalable run-time business strategies. The systems include a strategy designer module or unit, with which business users may easily define or configure overall business strategies and/or strategy components, which in turn, may be easily reused or implemented at specific run times for particular businesses.

The strategy designer unit comprises a strategy application module for representing a business strategy as a tree of calculation components, a filtering framework for identifying relevant data from various sources such as historical sales, a calculation engine for performing calculations on the relevant data, and a data tracker module for managing calculation data inputs. Moreover, the strategy designer unit includes user interfaces that allow the designing, editing, and running of business strategies. With formulating an overall strategy for a particular business and performing calculations based on historical data and other pre-defined criteria, users may easily represent and execute any aspect of the particular business process, including testing its viability.

In the following description, for purposes of explanation, numerous specific details are indicated in order to provide a thorough understanding of the technology described. It should be apparent, however, to one skilled in the art, that this technology may be practiced without these specific details. In other instances, structures and devices are shown in block diagram form in order to avoid obscuring the technology. For example, the present technology is described with some embodiments below with reference to user interfaces and particular hardware. However, the present technology applies to any type of computing device that can receive data and commands, and any devices providing services. Moreover, the present technology is described below primarily in the context of providing a complete strategy solution for business users, while providing flexible, scalable, accurate, and auditable results; however, those skilled in the art should understand that the present technology can be used for other applications other than simply for business purposes.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory of either one or more computing devices. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," or "displaying" or the like, refer to the action and processes of a computer system, or similar electronic computing device, that manipulates and transforms data represented as physical (electronic) quantities within the computer system's registers and memories, into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware embodiment, an entirely software embodiment, or an embodiment containing both hardware and software components. In some embodiments, this technology is implemented in software, which includes but is not limited to firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

System Overview

FIG. 1 is a high-level block diagram illustrating some embodiments of a system architecture indicated generally by reference numeral 100, which is configured to provide an overall business strategy and design or model for a particular business of interest or simulate discrete operations for the particular business of interest. It should be recognized that modeling is a tool for representation and a model defines the boundaries of the system that a particular user desires to simulate. The system architecture 100 utilizes modeling and simulation tools to project business processes with a high degree of fidelity to actual processes and represent behavior of the systems of interest. The system architecture 100 is illustrated in a distributed environment, for example, with multiple servers that may be entirely or partially dedicated to the formulation of business strategies. In some examples, the servers may be part of a business application network, providing access to users. The system architecture 100 is configured to enhance the flexibility, scalability, and auditability of the business strategy and design.

The system architecture 100 includes one or more business application servers 101a, 101b, through 101n, that may be accessed via user devices 115a through 115n, which are used by users 125a through 125n, to connect to any one of the business application servers 101a, 101b, through 101n. These entities are communicatively coupled via a network 105 to facilitate information exchange between the user devices 115a-n and the business application server 101a-n. Although only two user devices 115a through 115n are illustrated, persons of ordinary skill in the art should recognize that any numbers of user devices 115n may be used by any number of users 125n.

Furthermore, while only one network 105 is illustrated as coupled to the user devices 115a through 115n, the business application servers 101a-101n, a business application user profile server 130, a web server 132, and a third party server 136, in practice, any number of networks 105 may be connected to these entities. In addition, although only one third party server 136 is shown, the system architecture 100 may include one or more third party servers 136.

In some embodiments, the business application server 101a is coupled to the network 105 via a signal line 104. Although only one business application server 101a is described here, persons of ordinary skill in the art should recognize that multiple servers may be present, as illustrated by business application servers 101b through 101n, each with functionality similar to the business application server 101a or different.

A business application user profile server 130 is illustrated as a stand-alone server in FIG. 1. In other embodiments of the system 100, all or part of the business application user profile server 130 may be part of the business application server 101a. The business application user profile server 130 is connected to the network 105 via a line 131. The business application user profile server has profiles for all the users or organizations that belong to a particular business application network. A third party server 136 is connected to the network 105, via signal line 137. A web server 132 is connected, via line 133, to the network 105.

The business application server 101a includes a strategy designer unit 103a, to which user devices 115a through 115n are coupled via the network 105. In particular, user device 115a is coupled, via line 108, to the network 105. The user 125a communicates with the strategy designer unit 103a, via the user device 115a, to start a business strategy designer process. Persons of ordinary skill in the art should recognize that the strategy designer unit may be stored in any combination, in the business application server 101a (illustrated by 103a), or in a user device 115a (illustrated by 103b), or in both, as illustrated in FIG. 1, or in only one of the devices or servers that are illustrated.

The strategy designer unit 103a is a system configured to flexibly create or formulate one or more business strategies, whether overall or for discrete portions of a particular business. In some embodiments, the strategy designer unit 103a may be part of a dedicated system providing access to users or the strategy designer unit 103a may be configured to be a web-based application. In any of the embodiments described, the strategy designer unit 103a includes independent components that are coupled to provide a constructive and complete solution for business users.

The strategy designer unit 103a allows business users to define business strategies and strategy components that may be implemented. The strategy designer unit 103a provides a strategy model for providing results of several calculation components that may be modified by the users. A strategy provides a framework for implementing business calculations on a particular data set. For example, a rebate strategy may be defined by determining a list of one or more particular customers, a list of one or more products so to the customers, a predetermined rebate percentage relating to the one or more products, and the condition under which the customers should receive the rebate.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 is of conventional type, wired or wireless, and may have any number of configurations such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105 may be a peer-to-peer network. The network 105 may also be coupled to or include portions of one or more telecommunications networks for sending data in a variety of different communication protocols.

In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the business application server 101a, the business application user profile server 130, the web server 132, and the third party server 136 are hardware servers including a processor, memory, and network communication capabilities. One or more of the users 125a through 125n access any of the business application servers 101a through 101n, via browsers in their user devices 115a through 115n and via the web server 132.

Figure 2:
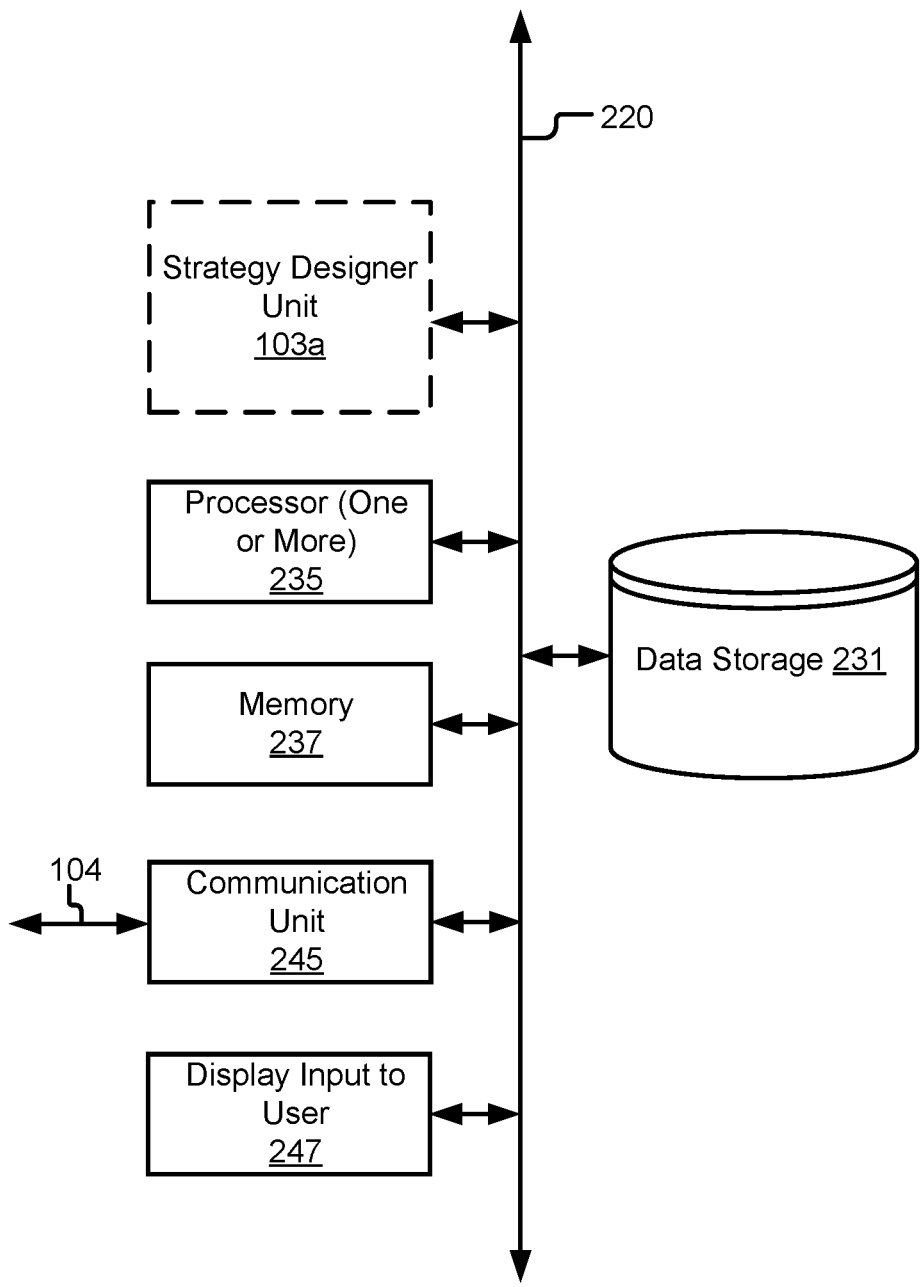
FIG. 2 is a block diagram illustrating an example embodiment of the one or more business application servers shown in FIG. 1, in particular, illustrating their hardware components.

FIG. 2 is the block diagram illustrating some embodiments of the hardware architecture of the business application server 101a. In FIG. 2, like reference numerals have been used to reference like components with the same or similar functionality that has been described above with reference to FIG. 1. Since those components have been described in detail above, that description is not repeated here. The business application server 101a generally comprises one or more processors, although only one processor 235 is illustrated in FIG. 2. The processor is coupled via a bus 220 to memory 237 and data storage 231, which stores the data and program instructions for the strategy designer unit and which stores any information received from any of the other sources identified above. In some embodiments, the data storage 231 is a database organized by the user. For each user, the data storage 231 stores data relevant to a particular business strategy including strategy component data.

A user 125a, via a user device 115a, communicates a request to design a strategy or a particular strategy component or responds to a request via communication unit 245. The "set up" for a strategy formulation is managed by the strategy designer unit 103a.

Figure 3:
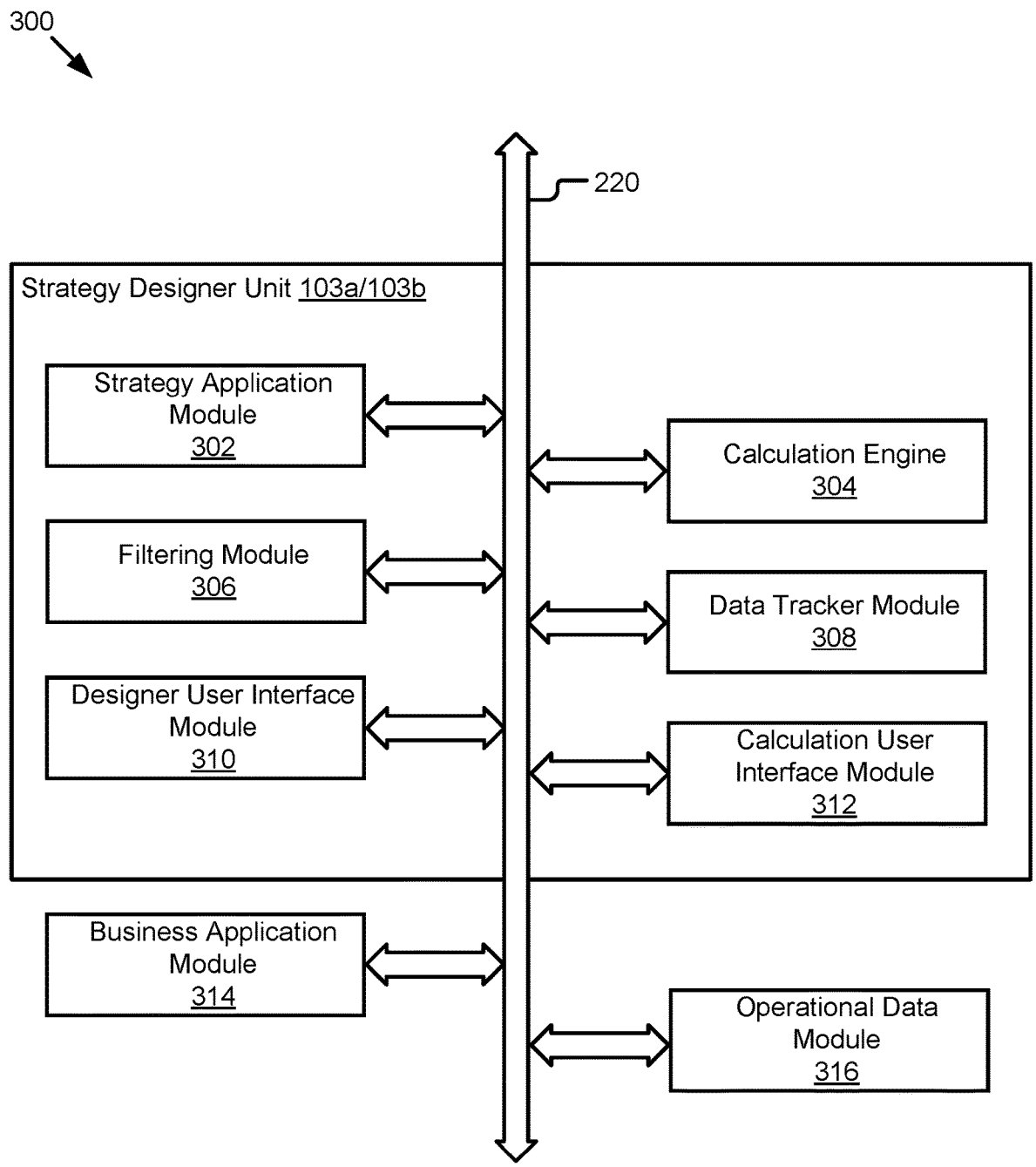
FIG. 3 is a block diagram illustrating an example embodiment of the strategy designer unit and its software components, as well as the business application module and the operational data module.

FIG. 3 is a block diagram illustrated generally by reference numeral 300, and indicating components within some embodiments of the strategy designer unit 103a/103b, a business application module 314, and an operational data module 316. The strategy designer unit 103a/103b further includes various modules: a strategy application module 302, a calculation engine 304, a filtering module 306, a data tracker module 308, a designer user interface module 310, and a calculation user interface module 312, all of which are communicatively coupled to the business application module 314 and the operational data module 316 over the system bus 220.

The strategy application module 302 is configured to define the structure for a particular strategy to be implemented. The structure includes the types of components to include in each strategy as well as the internal structure of those components. The calculation engine 304 performs the necessary calculations as defined in the formulas in the components on data that are identified from the operational data module 316 by the filtering module 306. The filtering module 306 identifies data from the operational data module 316. The data tracker module 308 is used to manage strategy data inputs that can be used across strategies. The data tracker module 308 tracks and provides storage for dynamic entities, the structure of which is defined by the business user, when operating the strategy designer unit 103a/103b (at runtime). The dynamic entities are used to drive conditional logic within the calculation engine 304 and the filtering module 306.

The designer user interface module 310 provides access to business users, to permit them to create and manage strategies that are formulated. In some embodiments, the calculation user interface module 312 permits business users to both set up parameters for the calculation engine 304 and view the results of the calculation engine 304. The "set up"

parameters are used by the calculation engine 304 to perform the necessary calculations.

The business application module 314 represents a specific business application that communicates with the strategy designer unit 103a/103b. For example, a rebate contracts application would use the strategy designer unit 103a/103b to set up and calculate performance-based rebates that are defined on contracts. A contract compliance application would similarly use the strategy designer unit 103a/103b to set up and determine how well the contracted customers are performing as compared to what they committed to when the contract was agreed upon. The business application module 314 comprises a variety of business applications including by way of example, applications on, 1) "Contract and Rebates Management," "Contract Compliance," "Net Pricing Alerts," "Rebate and Fee Accruals," "Discount Reallocation," "Initial Best Price," "Sales Analytics," etc.

The operational data module 316 receives and stores data for use by the strategy designer unit 103a/103b. For example, the operational data module 316 may receive data on customers, products, base price lists, sales lines, etc. The operational data module 316 does not require the data to be dimensionally modeled as star or snowflake schemas; thus, allowing flexibility in the types of data that may rapidly be included in the calculations.

The strategy designer unit 103a/103b defines user privileges for three particular user types or user classifications: 1) end business users, 2) advanced business users, and 3) technical users. The end business users use pre-defined strategies in the context of their business objectives and manage the calculation results. The advanced business users are provided with tools to create new strategy and strategy component templates. The technical users, typically within, IT or Professional Service organizations, are provided with tools to create new strategy and component types.

Figure 4A:
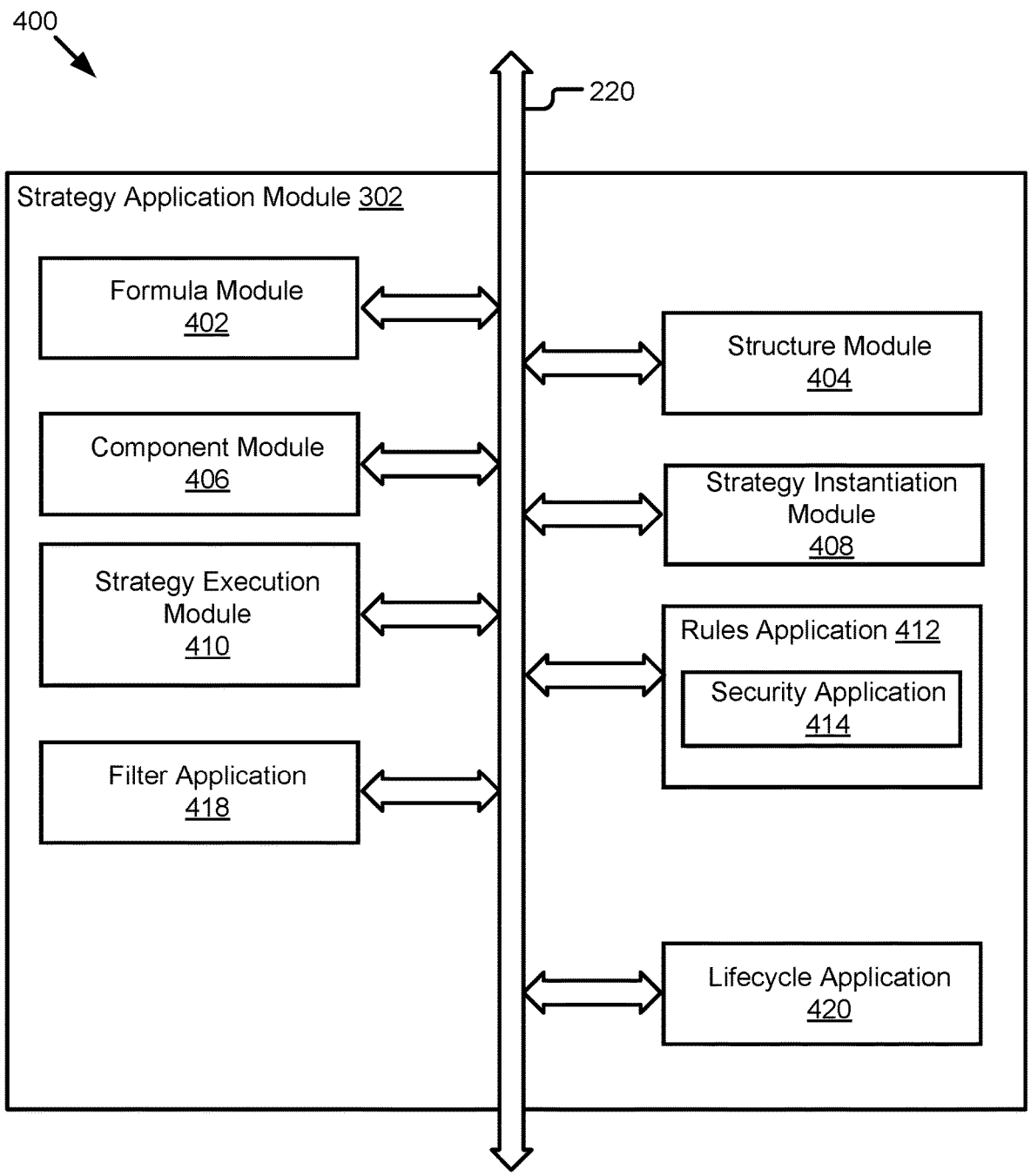
FIG. 4A is a block diagram illustrating an example embodiment of the strategy application module (shown as block 302 in FIG. 3) and its software components.

FIG. 4A is a block diagram indicated generally by reference numeral 400, which illustrates various components within the strategy application module 302. In some embodiments, the strategy application module 302 includes a formula module 402, a structure module 404, a component module 406, a strategy instantiation module 408, a strategy execution module 410, a rules application 412, a filter application 418, and a lifecycle application 420, all of which are communicatively coupled to the system bus 220.

The formula module 402 defines a unit of computation logic represented by a "formula." A formula is a named object that describes a single computational expression that is stored in a "variable." The value for the "variable" may be single-valued or multi-valued. Multi-valued variables are dimensional and may hold a value for each combination of the elements in the dimension set. For example, the base price may be represented by a variable that is multi-valued by being tied to a product and time dimension (e.g. a base price value per product and period). The value of the variable may be typed. The value may a primitive value (e.g. strings, numbers, booleans) or a complex object, such as customer or product. The values are stored in structures defined by the structure module 404.

The "name" of a formula provides a unique identifier for the formula within the structure in which it's stored. The "expression" of the formula is a series of statements, which when evaluated provides the "resulting" value for the variable. For example, a business user may define a formula that calculates the "line price" using the "price per unit" and "quantity", linePrice=pricePerUnit*quantity In some embodiments, the form used to author the expression may be a simple mathematical expression or a programming language (e.g. JavaScript, Ruby, Python).

The structure module 404 defines a structure that may be used to store the values resulting from the evaluation of the formulas. The structure is configured to be a data grid, with n-columns and m-rows. Each structure may be configured to include an arbitrary number of columns and rows.

In some embodiments, a column of a structure is configured to have the following properties (where n identifies the column):
1. name: the name of the structure
2. type: the type of the structure (i.e. name/value, tiered, generic)
3. col_n_name: the name of column n
4. col_n_type: the data type of column n
5. col_n_args: additional arguments used by the data type, such as the date format, the number of decimal places, the list of valid values for the 'list' data type, etc.
6. col_n_default: the default value
7. col_n_desc: a human-readable description for column n
8. col_n_rules: the validation, visibility, and editability rules for that column In some embodiments, a row of a structure is configured to have the following properties:
1. row_num: the row number
2. row_n_value: the value of row n
3. row_n_type: the value of row n
4. row_n_args: additional arguments used by the data type, such as the date format, the number of decimal places, the list of valid values for the 'list' data type, etc.
5. row_n_desc: a human-readable description for row n
6. row_n_rules: the validation, visibility, and editability rules for that row The type, arguments, and rules (i.e., col_n_type, col_n_args, and col_n_rules) may be defined at the column level or cell level. At the column level, the value of these properties would be the same for all rows. At the cell level, each row may have different values for these properties. If these have been defined in both places, the cell level may be used.

In some embodiments, the following structure types may be configured for use:
1. Name/Value: This type of structure requires only two columns. The first column is the 'label' whose type is a string, while the second column is the value whose type may be defined by user input. Users may add as many rows as they wish or need.
2. Tiered: This type of structure allows the user to define different values for different tiers. The first column of the structure is a tier value (e.g., tier 1, tier 2, etc.). The tier values may be defined in increasing order. Users are permitted to define additional columns, where the number of rows is dictated by the number of tiers defined by users in the strategy.
3. Generic: This type of structure is configured to be the most flexible, allowing users to add and remove as many rows and columns as they wish or need.

Additional structure types may be added as needed.
The following example data types may be used:
1. string: This type represents character strings.
2. date: This type represents dates including both date and time components. The format used to show the date in the designer user interface module 310 is defined in the args property.

3. number: This type represents a double precision floating point number. The format used to show the number is defined in the args property.
4. enum: This type is a reference to a specific value from an enumerated list of values defined in the underlying data model.
5. list: This type is a reference to a specific value from a defined list of values that are stored in the args property.
6. business object: This type is a reference to a business object that is defined in the underlying data model.
7. percent: This type is a variant of the number which is used as a percentage. The percentage format is defined in the args property.
8. currency: This type represents a monetary value that has an associated currency. The format and currency is defined in the args property.

The component module 406 defines component templates that are prototype components that are cloned to create component instances. The component templates provides a means to create libraries of components easing the effort required to use strategies. A component template may be created based on a component type that holds information about the required input parameters and the expected output results; thus, defining the interface for all components of a given type. The component template inherits all the aspects from the component type. Examples include a "tier qualification" component type that would require the component output, the "tier attained," and a "rebate benefit" component type that would require the component take the "tier attained" as an input. All formulas and structures inherited from the component type may not be removed once a component template has been created.

Using the designer user interface module 310, users may add expressions and formulas, as desired. Formulas defined by the component type are required and drive the outputs.

A strategy template may be created from a strategy type that is composed of component templates defining the allowable components. The embedded component templates provide knowledge of the types of components the strategy can support and the designer user interface module 310 may show the user what component types may be added to a certain strategy. The strategy may restrict the number of allowable components that may be included, such as 0-1, 0-n, or 1-n. A strategy is configured to evaluate its components, passing the proper inputs and outputs for each included components. The strategy is structured to tie its components together, taking results from one component, and potentially passing the results to another, as inputs. The logic that executes this structure is stored in a formula defined in the strategy component. The strategy level formula objects (as opposed to component level formula objects) are referred to as 'orchestrators.'

One interesting and powerful aspect of this technology is the ability to add structures to strategy and component templates, as needed. These structures are used to parameterize the calculation (one or more calculations). For example, a rebate percentage component may have a name/value structure with one row allowing a user to specify a rebate percentage to be applied in the calculation. Structures are effective means to expose complex strategies to business users by simply displaying a few parameters that may be changed or set by the user.

The strategy instantiation module 408 employs the business application module 314 that uses strategy templates to create discrete strategy instances. A strategy instance is used to set up the strategy calculation for a specific business purpose. For example, a particular "contract" may use a rebate strategy template to create a rebates strategy instance that may be edited by the user to set up the specific customer, products, rebate percentages, etc. Users cannot modify formulas in an instance, but they may enter values that have been parameterized through the use of structures.

The strategy execution module 410 generates a strategy result graph from a strategy instance that has been set up and implemented. The strategy result graph is generated based on the strategy definition. Since multiple results may be required, the strategy result graph is not an identical copy of the strategy template. For example, a one year rebate strategy with quarterly payments would require a calculation to be performed every quarter. For a "what-if" style application, the "multiple results" graph may correspond to multiple user-defined scenarios.

The strategy result graph is comprised of three levels: definitions, periods, and buckets. One "definition" is created per strategy instance and is the root object in the strategy result graph, holding multiple periods. A period represents a complete strategy calculation and includes multiple buckets, each of which represent the data used in each component of the strategy. A bucket includes data that are the results obtained from the filtering module 306 and are the data based on which the calculation is performed. The bucket also includes the results of the calculations.

Structures in the strategy result graph may be created at different levels as indicated below:
1. Definition level structure: This structure allows users to override results or set variables impacting all periods.
2. Period level structures: These structures allow user to override results or set variables impacting that period and allow displaying aggregate results for that period.
3. Bucket level structures: These structures allow users to override results or set variables impacting that bucket and allow displaying aggregate results for that bucket.

In addition, calculation results may also be stored on the bucket line for line level formulas.

The strategy designer unit 103a/103b allows users to define formulas at four different levels:
1. Line level: These formulas are applied on the bucket line and results are stored on the bucket line. These expressions may be optimized against very large data sizes. The calculations may be translated into UPDATE SQL statements so that the processing is performed in the database.
2. Aggregate level: These formulas are applied on the bucket lines and results stored on a bucket structure. These expressions may be translated into aggregation SELECT SQL statements and manipulated in memory for performance reasons.
3. Calculation level: These formulas are executed in-memory against the data stored in structure and results objects stored in a bucket structure.
4. Dimension level: These formulas are evaluated first and are applied on the bucket lines. The results are stored on the bucket line. The mechanism is identical to the Line level formulas except that this result is used by the Aggregate level as a dimension.

Formulas of any level may be sequenced in any order based on the strategy definition, which allows for either "top-down" or "bottom-up" calculations. For example, calculating a percentage of rebate could be done in one of two ways:
1. Top-Down:
   (a) Aggregate Formula: totalAmt=sum(amt)
   (b) Calculation Formula: result=totalAmt*percent 2. Bottom-up:
   (a) Line level: benefit=amt*percent
   (b) Aggregate Formula: result=sum(benefit)

Note that in the above example the variable percent can be fetched from a structure, which has a value that may have been set by a user or by another formula.

A single strategy template may be used against different sets of dimensions. A dimension is a data element that is used to categorize a data set into non-overlapping regions. For example, a date dimension may categorize the data into days, months, quarters, and years. The dimension may be used within a calculation to compute results within the different categories. For example, a rebate percentage may allow the calculation to be performed for products or customers. Therefore, the calculation may be performed once, per product, per customer, or per product and customer without modifying the formulas, structures, or any other objects in the strategy template. The user may select the set of dimensions used through the user interface during the "set up" process.

The strategy designer unit 103a/103b allows for two types of dimensionality, local and global dimensions. Local dimensions may be defined explicitly in the formulas, whereas global dimensions may be set in the calculation context and propagated to all formulas, making it easier to define and use formulas.

In order to improve extent of use and allow one strategy to be used for multiple purposes, the strategy can be parameterized through structures, thereby exposing input fields that may be exposed to the calculation user interface module 312. Formulas and filters may be conditionally controlled through this mechanism.

Figures 1, 2, 4B:
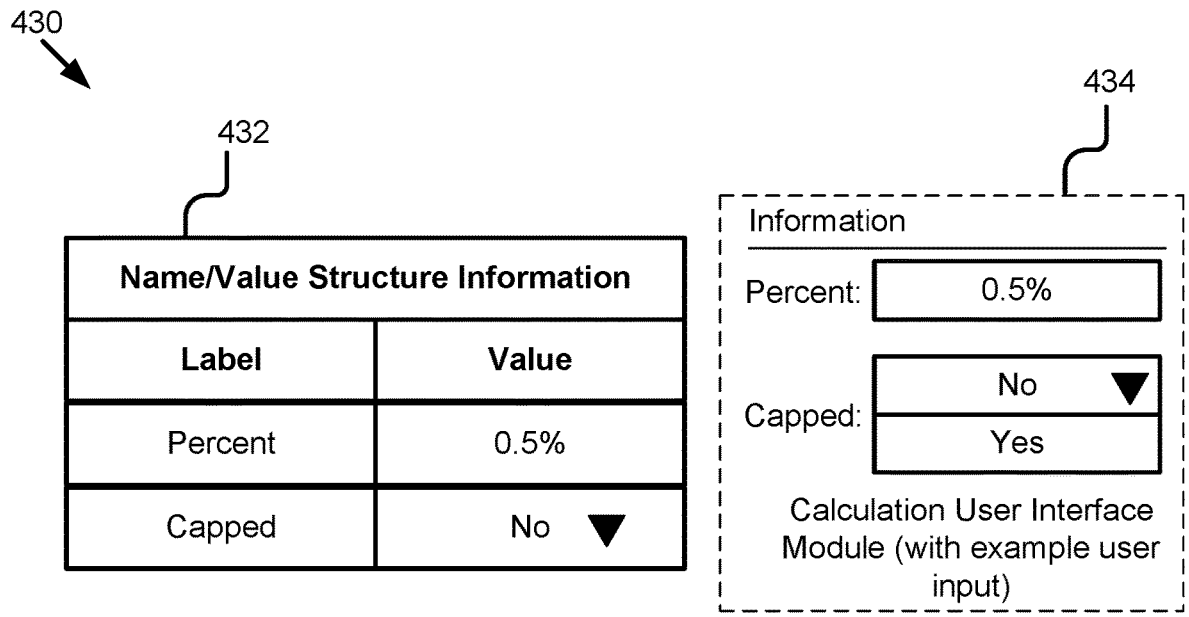

An example of this parameterization mechanism 430 is shown in FIG. 4B-1. In the FIG. 4B-2, the table 432 shows a Name/Value structure in a component instance, which includes two variables: 'Percent' and 'Capped.' The table 434 shows calculation user interface module where users may set up the values for 'Percent' and 'Capped' through a text-box and a drop-down field. The table 436 (FIG. 4A) shows the formula in the component instance, which defines the calculation logic for the variables in the component instance.

The rules application 412 (FIG. 4A) defines one or more rules that apply to a strategy. The rules application 412 includes a security application 414 (FIG. 4A). The security application 414 sets the visibility and editing rules that provide flexibility in controlling how and what users may see and edit in the business application module 314 (FIG. 3).

In some embodiments, the rules may be set on the structure cells and column headers and include the following three types:

1. Required: A boolean variable that defines whether a cell or a column contains a value that must not be empty.
2. Visible: A boolean variable that defines whether a cell or a column is visible to the end user in the calculation user interface module 312.
3. Expression: An expression is a rule that will trigger a validation error if the result is false. For example, the expression "and (value>=0, value<=1)" indicates the values in a cell has to be between 0 and 1. In another example, the expression "if (cell (−1)==true, is Required (true), is Required (false))" indicates making a value required if the above cell is set to true.

In some embodiments, the rules may be set on the Formula Object described as follows:
1. Overridable: A boolean variable that defines whether a value may be overridden by users in the calculation interface module 312.

The visibility and editing of rules may be used to ensure that the strategy is used within defined boundaries. For example, a pricing analyst may create a pricing strategy and make it available to a contract analyst whilst constraining the discount to be within defined limits. Different levels of approvals may also be triggered by such a mechanism.

A strategy template includes one or more filters defined by the filter application 418 (FIG. 4A). A strategy may hold multiple filter sets. Each filter set has a unique name that may then be used as a dimension in the formula, allowing a calculation to identify data from a specific filter set.

A filter set may hold multiple filter conditions. Filter conditions are specific to a single data source (e.g. a database table). Depending on the data source, different filter operators and variables are available corresponding to the data source's fields. Filter conditions may hold multiple filter expressions, each of which are defined as a variable (on the data source line or other objects referenced by that line), an operator, and a value or set of values.

Filters may be structured to allow business users to model complex boolean expressions without requiring placement of parenthesis in the right place. Filter sets may be OR'ed together. Filter conditions may be OR'ed together. Filter expressions may be AND'ed. The structure is defined as:
1. Set [OR Set]
2. Condition [OR Condition]
3. Expression [AND Expression]

Some filter logic examples are shown in the table indicated below.

| Filter Logic | Filter Structure |
|---|---|
| Data Source: S<br>(s.a = 0 AND s.b = 1) OR (s.a = 1) | Set: set1<br>  Condition: S<br>    Expression: s.a = 0<br>    Expression: s.b = 1<br>  Conditions: S<br>    Expression: s.a = 1 |
| Set 1:<br>Data source: S<br>(s.a = 0 AND s.date between x1 and y1)<br>OR (s.a = 1)<br>Set 2:<br>Data Source: S<br>s.a = 0 AND s.date between x2 and y2 | Set: set1<br>  Condition: S<br>    Expression: s.a = 0<br>    Expression: s.date between x1 and y1<br>  Condition: S<br>    Expression: s.a = 1<br>Set: set2<br>  Condition: S<br>    Expression: s.a = 0<br>    Expression: s.date between x2 and y2 |

Filters are performed using an "as-of" date to allow running a calculation based on a criteria, "as-of" a particular time in the past. The "as-of" date gives the ability to reproduce the calculation as if the calculation was performed in the past.

Formulas may be tagged with actions. These actions translate to a button on the strategy results user interface, which allows users to have more granularity and control as to what part of the calculation may be executed. Translating formulas to "buttons" on the strategy results portion of the calculation user interface module 312 is useful for multi-step calculations. This mechanism allows for potentially asking users for input, before moving on to the next step. This is particularly useful in postponing expensive calculations to the end, after a user review of an initial part of the result graph.

The lifecycle application 420 (FIG. 4A) defines the lifecycle for strategies. Strategy designer calculations are typically tied to applications and business objects that have a lifecycle. In some embodiments, the lifecycle rule defines different lifecycle states of the calculation result graph. Some states may be marked as "immutable," at which point, a recalculation may generate a separate results graph. This may be accomplished at the period level and/or at the mid-period level. At the period level, a new period is created and tied to the original period. At the mid-period level, all structures are indicated by versions and effectively dated.

Figure 4C:
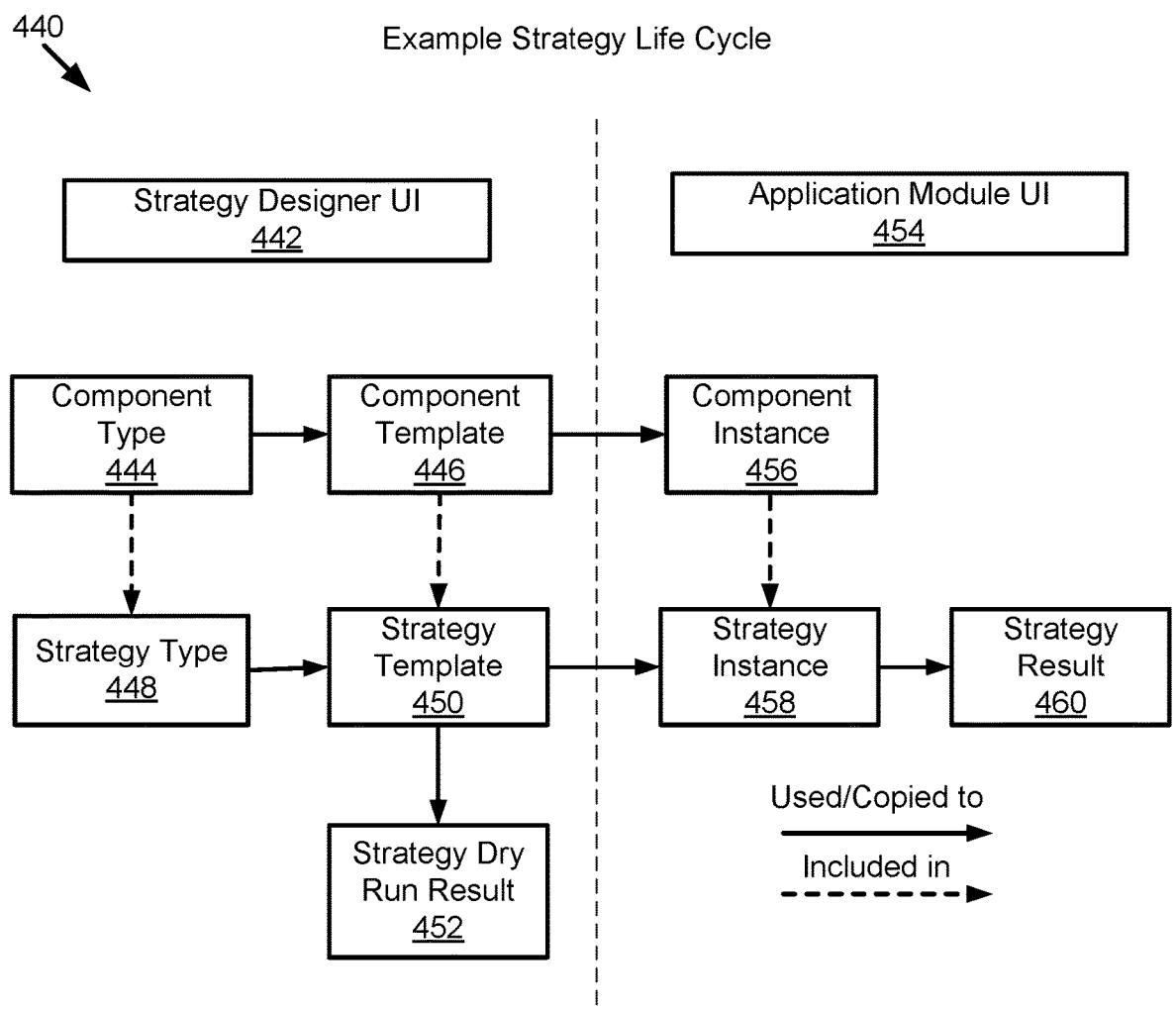
FIG. 4C is a block diagram illustrating an example strategy life cycle.

FIG. 4C illustrates one example of a lifecycle for a strategy indicated by reference numeral 440. Based on user inputs, the strategy designer user interface (UI) 442 defines a component type 444, a component template 446, a strategy type 448, a strategy template 450, and a strategy dry run result 452.

Strategy designer UI 442 allows users to test their strategy templates before activating them (i.e., before making them available for use by application modules). Users may "dry run" the strategy to ensure the calculation results are correct. The "dry-run" may allow the user to load data or specify which data in the operational data module 316 to use for the test.

The component type 444 is a part of strategy type 448 and the component template 446 is a part of the strategy template 450. The component type 444 and the strategy type 448 are used and/or copied to generate the component template 446 and the strategy template 450. The strategy template 450 is further used and/or copied to generate strategy "dry run" results 452.

The application module user interface UI 454 creates a component instance 456, a strategy instance 458, and a strategy result 460, based on a component template 446 and a strategy template 450, defined by strategy designer UI 442. The component template 446 is used and/or copied to generate a component instance and a strategy template 450 is used and/or copied to a strategy instance 458. The component instance 456 is included in a strategy instance 458. The strategy instance 458 is further used and/or copied to generate strategy results 460.

Figure 4D:
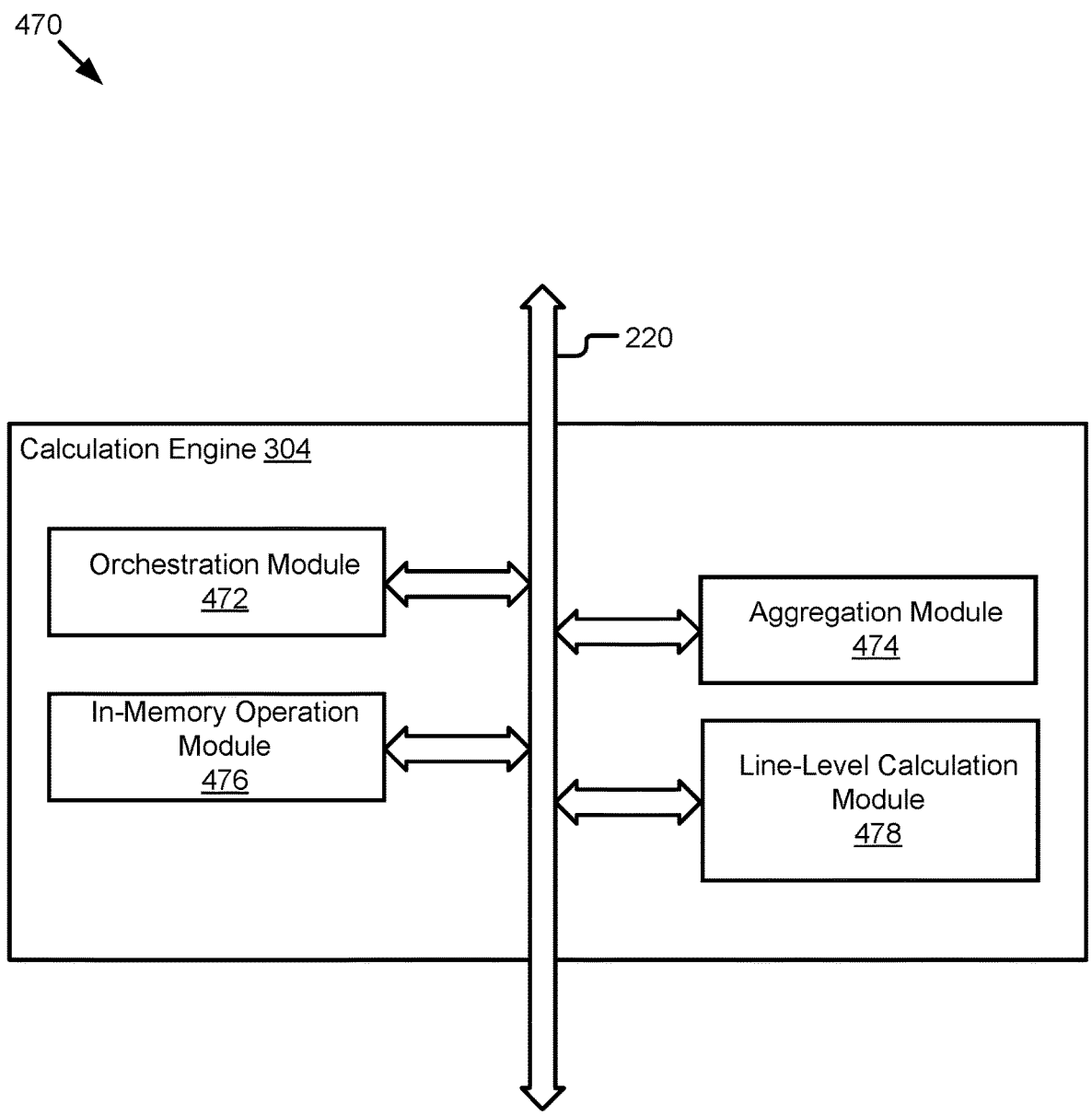
FIG. 4D is a block diagram illustrating some embodiments of the calculation engine (referenced in block 304 in FIG. 3) and its software components.

FIG. 4D is a block diagram indicated by reference numeral 470 that depicts the calculation engine 304 for performing the calculation on the data. The calculation engine 304 includes an orchestration module 472, an aggregation module 474, an in-memory operation module 476, and a line-level calculation module 478. All of these modules are communicatively coupled to the system bus 220. The orchestration module 472 evaluates all strategy level formulas, i.e., orchestrators for performing the calculation.

An example of evaluating an orchestrator is described as follows:

The above code is typically more complicated than any formulas that may be written in components with just one line being evaluated into a variable. Strategy level formulas (orchestrators) act differently from component level formulas in that the strategy level formulas manipulate hypercubes (multi-dimensional cubes) instead of single variables. Therefore, the resulting variable in the above example actually refers to a structure and the sum function, and actually manipulates multi-dimensional cubes, which means that the dimension sets must match before performing the operation. This orchestrator returns the resulting variable so the structure is persistent.

The orchestrators are only evaluated once per calculation, independent of the number of dimensions.

Another example using a tiered rebates use case is illustrated below, where qualification components compute the tier attained and the benefit components compute the rebate amount. In this case, the strategy type was configured with "qualification" and "benefit" component types as "allowable" components. These component types were created from the strategy designer user interface.

```
var quals;                    //holds the minimum tier attained
var results;                  //holds the sum of the rebate amount
for (comp in components)
{
    if (comp.type == 'qualification')
    {
        var rs = comp.eval( );
        if (quals) {quals = min(quals,rs);}else{quals=rs;}
    }
}
for (comp in components)
{
    if (comp.type == 'benefit')
    {
        var rs = comp.eval(quals);
        if (result) {result = sum(result,rs);} else {result = rs;}
    }
}
return merge(quals,result);
```

The orchestrator loops over all "tier qualification" components and evaluates them, making sure to only keep the minimum tier attained. The component results are persistent so that all intermediary results are always saved. The orchestrator then loops over all the benefit components and sums their results to obtain the overall sum of the rebate amounts.

The orchestrator returns a merged structure containing all the columns of both the "quals" and "result" structures. The orchestrator could also be split into the two formula variables: "quals" and "totalAmount," which may be stored in different structures and which are described as follows:

```
var results;                  //variable to hold the result structure
for (comp in components)      //loop over all components in that strategy
{
    var rs = comp.eval( );    //evaluate that component
    if (result)               //check if result is set
    {
        result = sum(result,rs);   // if result is not null, sum it with the result rs
    }
    else
    {
        result = rs;          //else set the result to point to the component result structure
    }
}
return results;
```

1. Name of the Formula Variable: quals

```
var quals;
for (comp in components)
{
      if (comp.type == 'qualification')
      {
            var rs = comp.eval( );
            if (quals){quals=min(quals,rs);} else{quals=rs;}
      }
}
return quals;              // will be stored in a structure called quals
```

2. Name of the Formula Variable: totalAmount

```
var result;
for (comp in components)
{
   If (comp.type == 'benefit')
   {
      var rs = comp.eval(quals);
      if (result) {result = sum(result,rs);} else {result = rs;}
   }
}
return results;            // will be stored in a structure called totalAmount
```

Note that the "quals" structure is passed to component when evaluating it. As mentioned before, a component type may include a structure that defines expected inputs. In this case, the benefit component type would have a structure defined with one variable called "tierAttained." The variable "tierAttained" may therefore, be available for use by the component formulas. Similarly, the qualification component type, therefore, defines its output to match the expected input of the benefit component. As described above, the mechanism to achieve this goal may simply add a formula with a variable name set to "tierAttained" in the benefit component type. This ensures that the result structure of the qualification includes a "tierAttained" variable. The result structure may return other variables as well, based on additional formulas defined in the qualification component instance.

Still using the example above, evaluating the strategy without setting any dimensionality may yield a result with a single row. However, if the product dimension was selected, multiple rows may be expected in the result structure. For example, in the event three products are selected in the filter, three rows may be expected in the result structure. Each row corresponds to one of the three products.

Dimensions may be defined and computed at evaluation time. In other words, dimensions may be added during a calculation. For example, the strategy designer unit 103a/103b allows a user to create a price band dimension, which has values that may be 1 for prices between 0 and 10, 2 for prices between 11 and 20, etc. The calculation may then be evaluated using this newly defined dimension and its resulting structure may result in as many rows as defined price bands. In some embodiments, the price band dimension formula might appear as follows:

```
if (and(price >= 0, price <10), 'band 1',
    if (and(price <= 10, price<20), 'band 2',
        if (price >= 20), 'band 3', 'unknown band')))
```

The merged orchestrator result would appear as follows:

| TierAttained | TotalAmount | PriceBand |
|---|---|---|
| 1 | $100 | band 1 |
| 1 | $150 | band 2 |
| 2 | $500 | band 3 |

The aggregation module 474 evaluates all aggregate level formulas, which are applied on the bucket lines and results stored on a bucket structure. In some embodiments, the aggregation module 474 converts the aggregate level formulas into a select SQL statement, adding a proper group-by clause based on the selected dimensions, and stores the result of the statement into a structure. The aggregate formula may only be evaluated once independent of the number of dimension sets. Each aggregate formula creates its own structure, which has a name that is the name of the variable defined in the formula object.

The in-memory operation module 476 determines how the calculation engine 304 evaluates the components. The "comp.eval( )" method is intercepted by the calculation engine 304, which loops over all its formulas in the order in which they were defined. The evaluation logic follows the following rules:

1. If formulas are dimension level, these formulas appear first before any other formulas in the component. These formulas are converted into an insert SQL statement without any dimensionality. These formulas may be evaluated once independent of the number of dimension sets.

2. If formulas are line level, these formulas are converted into an insert SQL statement adding proper where clause filters in case dimensions are selected. The computed value may be inserted into a 'pre-allocated' column on the bucket line. These formulas may be evaluated once independent of the number of dimension sets.

3. If formulas are aggregate level, these formulas are converted into a select SQL statement adding a proper group by clause based on the selected dimensions. The result of this statement is stored into a structure. These formulas may be evaluated once independent of the number of dimension sets. Each aggregate formula may create its own structure, which has a name that is the name of the variable defined in the formula object.

4. If formulas are at calculation level, these formulas are evaluated in-memory and their results are stored into one result structure. These formulas are evaluated once per combination values of all selected dimensions.

The calculation engine logic is described as follows:

1. All dimension levels are first evaluated:

```
for (formula in component)
{
      if (formula.level == 'Dimension')    // sets the dimension value
      on the bucket line
      {
            sqlEngine.evalDimension(formula,calcCtx);
      }
}
```

2. All the other formula levels are the evaluated in order:

```
for (formula in component)
{
        if (formula.level == 'Line')        // sets the value on the bucket line
        {
                sqlEngine.evalLine(formula,dimensions,calcCtx);
        }
        else if (formula.level == 'Aggregate')   // creates a new aggregation structure
        {
                sqlEngine.evalAggr(formula,dimensions,calcCtx);
        }
        else if (formula.level == 'Calculation')  // sets the value on the result structure
        {
                imEngine.eval(formula,dimensions,calcCtx);
        }
}
```

The calculation context "calcCtx" is a global transient object that holds the state of the calculation. While in the various steps, the state provides a means of accessing the in-memory state of the calculation.

The in-memory operation module 476 supports three calculation modes as follows:
1. Full: The "full" mode executes the complete calculation for all bucket lines. Any previous intermediate or final results are discarded.
2. Incremental: The "incremental" mode executes the calculation only for the newly added bucket lines since the last time the calculation was run. New bucket lines may have been added as new data was loaded into the system. This mode provides a significant performance gain as typically the number of newly added lines can be far fewer than the overall number of lines in the bucket. The aggregation step must support incremental processing. In some embodiments, the aggregation functions include "sum", "minimum", "maximum", "count", "average", "standard deviation", and "variance".
3. In-Memory: The "in-memory" mode does not execute any of the "line", "dimension", or "aggregation" level formulas. Only the calculation level formulas are executed. This mode is provides a rapid recalculation mechanism after the user has made some overrides when looking at the results in the calculation user interface module 312.

The line-level calculation module 478 facilitates the calculation for line-level formulas. The line-level formulas are applied on the bucket line and the calculation results are stored on the bucket line. In some embodiments, the line-level calculation module 478 optimizes the formulas against very large amounts of data by translating the calculations into UPDATE SQL statements so that the processing is performed in the database.

Figure 4E:
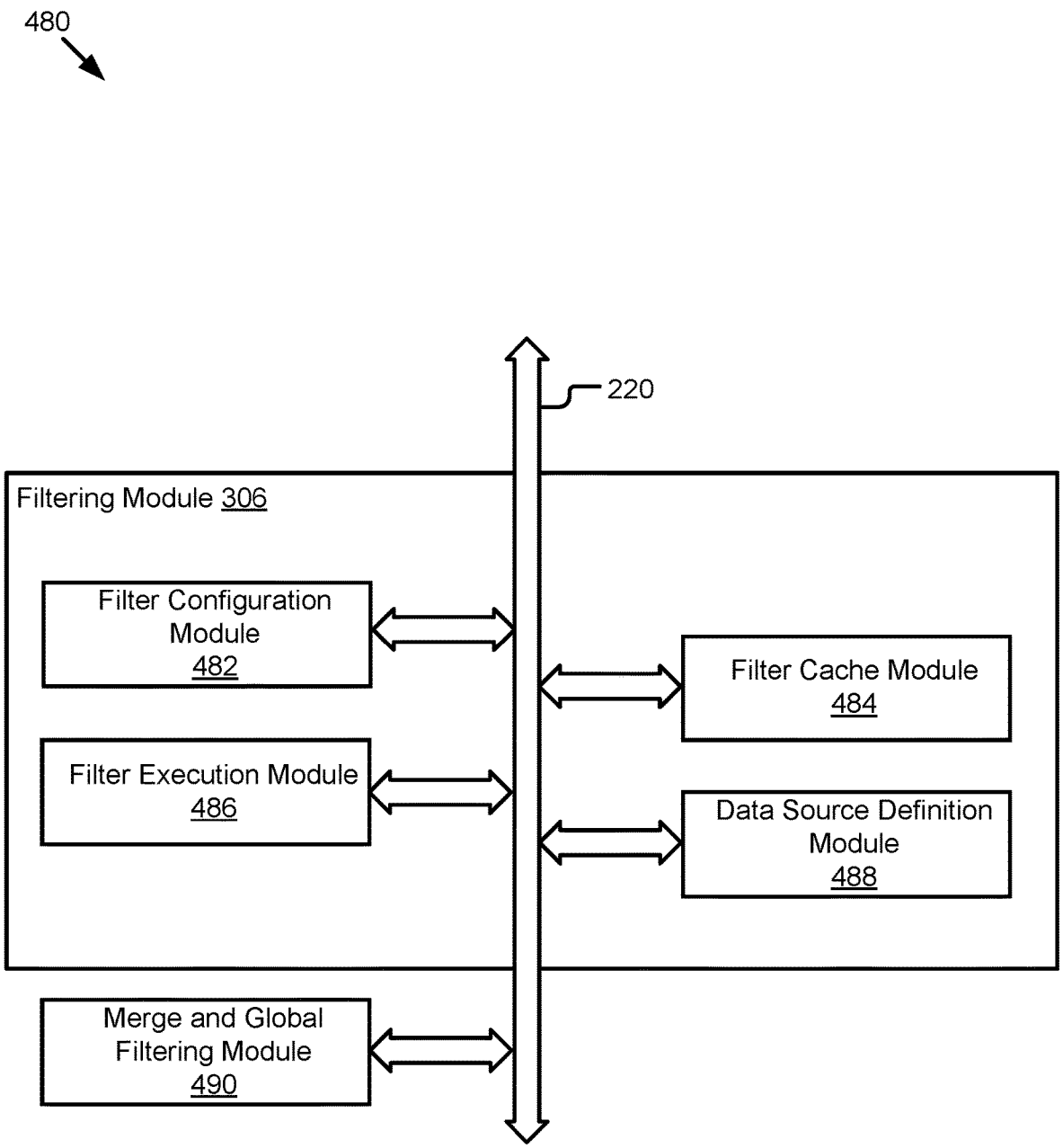
FIG. 4E is a block diagram illustrating some embodiments of the filtering module (referenced in block 306 in FIG. 3) and its software components.

FIG. 4E is a block diagram indicated by reference numeral 480, which illustrates the filtering module 306 and a merge and global filtering module 490 communicatively coupled via the bus 220. The filtering module 306 identifies the data for use by the calculation engine 304. In some embodiments, the filtering module 306 may be a highly tuned SQL filtering framework that allows business users to create and run complex filtering rules in an intuitive and efficient manner. The filtering module 306 includes a filter configuration module 482, a filter cache module 484, a filter execution module 486, and a data source definition module 488, all of which are communicatively coupled to the merge and global filtering module 490 over the system bus 220.

Different from typical systems, the SQL expression used to filter the data is not generated upon execution, which allows the system to maintain sound performance across a diverse set of filter conditions against large volumes of data. In this embodiment, there is a single SQL query that handles all possible filters defined in the filter configuration module 482. To handle all possible filters, filter conditions are modeled as "joins." Therefore, the database query plan may be known as priori and optimized once.

The filter configuration module 482 defines all possible filters that may be handled by the SQL query. Filters may be expressed with filter sets, filter conditions, and filter expressions, all of which drive the filter user interface with which the business user creates the filter logic. When a data source is selected under the filter condition logic, a list of available attributes, operators, and values are then available for the user to select. These lists of attributes, operators, and values are defined through the filter configuration module 482.

The filter configuration module 482 provides a mechanism by which new data sources are registered and their filterable attributes are defined. These attributes may reside directly on the data source itself or any aspect related to the data source. For example, direct sales data source may be defined such that it may filter based on the invoice date of a sale (an attribute on the direct sales object) or based upon the customer zip code (an attribute on the customer that is referenced by the direct sales object).

The filter configuration module has the following properties:

| Name | Description |
| --- | --- |
| Data Source | The Data Source Name. All information about this data are stored in a different table. |
| Object Label | The user interface label of the object on which to filter, for example, customer, product, sales, etc. |
| Object Reference | The pointer to the object definition. |
| Attribute Label | The user interface label of the object attribute with which to filter, for example, customer.name, product.sku, sales.amount, etc. |
| Attribute Name | The actual attribute name as defined on the object. |
| Value Type | The data type of this attribute. It could be Enum, List, String, Number, etc. |
| Operator | The valid operator for this object and attribute, for example, =, >, <, starts with, between, in, etc. Not all operators need be valid for all attributes. |

-continued

| Name | Description |
|---|---|
| Application Module | The list of applications using this attribute operator combination. Some applications, for example, might not need to filter on customer.name for example. |
| Version | Everything is versioned and effective dated in order to handle reproducibility and auditability. |

The filter cache module 484 stores the information for filters. In order to ensure the highest bucketing query performance, the concept of driving filters is introduced and used. Driving filters are filters identified as having the highest 'filtering' impact on a data source (i.e., an ability to reduce the data by the greatest amount). Therefore, the driving filters are applied first, directly against the data source tables, while all other filters are applied on the 'first-pass' filter, which ensures high performance, and most importantly, consistency performance, independent of the filters being evaluated and the data distribution characteristics of the data source.

Since driving filters are often different, based on the use cases and the business application module 314 and its use of the filtering framework, the strategy designer unit 103a/103b supports multiple driving filter configurations, as shown in the following example.

| Driving Filter Configuration ID | Product | Customer | Invoice Date | Paid Date | Contract |
|---|---|---|---|---|---|
| 1 | x | X | x | | |
| 2 | | X | x | | X |
| 3 | | X | | x | X |

The filtering framework selects the appropriate driving filter based on the filter criteria configured. Additional driving filter configurations may be added as needed.

The filter cache module 484 has multiple sections. Each section corresponds to an object name defined in the filter configuration table. The following example illustrates the configuration of the filters in the cache.

Filter configuration: the cache column cannot be the same for two rows under the same object.

| Data Source | Object | Attribute | Operator | Data Type | Data Args | Cache Col 1 | Cache Col 2 |
|---|---|---|---|---|---|---|---|
| Sales | Cust | name | is | String | | Col 1 | |
| Sales | Sale | Invoice date | Between | Date | | Col 1 | Col 2 |
| Sales | Prod | sku | in | String | | Col 1 | |
| Sales | Prod | type | is | Enum | Item, Cat | Col 2 | |
| Inventory | Sales | OnHand | > | Number | | Col 1 | |

Filter: (prod.sku in (123,456) AND prod.type=Item) OR prod.sku=789

| Filter Set | Filter Cond. | Data Source | Filter Expr. | Object | Attribute | Operator | Value |
|---|---|---|---|---|---|---|---|
| 1 | 1 | Sales | 1 | Prod | sku | in | 123,456 |
| 1 | 1 | Sales | 2 | Prod | type | in | Item |
| 1 | 2 | Sales | 3 | Prod | sku | in | 789 |
| 1 | 2 | Sales | 4 | Cust | name | is | cust1 |

Filter cache is updated as follows, where the cells are populated with filter values.

| Section | Col1 | Col2 | Col3 | Col4 | Filter Set | Filter Cond |
|---|---|---|---|---|---|---|
| Prod | 123 | Item | | | 1 | 1 |
| Prod | 456 | Item | | | 1 | 1 |
| Prod | 789 | | | | 1 | 2 |
| Cust | cust1 | | | | 1 | 2 |

It should be recognized that ANDs are, within sections, stored on the same row in the filter cache, whereas ORs are stored on separate row. Also, it should be recognized that the cache section corresponds to the filter object, which may also be referred to as 'dimensional' data using OLAP terminology.

From the filter cache table, the bucketing query knows that the cache column 1 of section "Prod" corresponds to the product referenced object in the "Sales Data" and the "sku" attribute in that "product" object. The bucketing query also knows to perform an AND criteria for every "ColX" of the same row of the cache table, to perform an AND between cache table rows with the same filter condition ID but different sections, and to perform an OR, otherwise within the same filter set.

In some embodiments, the bucketing SQL query is then generated once, based on the filter configuration table, and never changed again, independent of the number of filters defined in the filter table. The query may be changed only if the filter configuration or filter driver configuration changes, which may not happen often. The bucketing query then joins the filter cache with the data source (and potentially other tables referenced by the data source table), one section at a time. The driving sections/attribute may be jointed to the data source table directly, whereas other sections may be joined on the intermediary results.

The filter execution module 486 is responsible for generating SQL statements, which is accomplished only once, at the time of setup, executing them in sequence, storing intermediary results in a global temporary table, and inserting the final results into the bucket line table. There are two mechanisms where operational data is brought into a strategy result period referred to as "pull" and "push" bucketing.

"Pull" bucketing refers to the process that starts with a known strategy result period. The process takes the predefined filters and determines what operational data is required and "buckets" that data in the strategy result period. The "bucket" mechanism is the association of the filtered operational data records into the strategy result period. In some embodiments, the "bucketing" mechanism may be performed by inserting records in a bucket line table that contains references to the filtered operational data records or simply by copying the filtered operational data records into the bucket line table directly. The "pull" bucketing process may be performed when new strategy instances are implemented to ensure that all existing operational data that may be required by the new strategy instance are included.

"Push" bucketing refers to the process that starts with an introduction of new operational data records into the system. The process uses the predefined filters across all implemented strategies and determines which strategy result periods, it should "bucket" the newly loaded data. The "push" bucketing process may be used on a periodic (e.g. nightly) basis to ensure that all implemented strategies are up-to-date with regard to any newly loaded data.

The data source definition module 488 provides the definition for the data source. The data source definition module 488 defines the set of attributes and references of data source to other objects that are available in the operational data module 316. In addition, the data source definition module 488 maps the attributes and references of data source to the attributes and references of bucket lines so as to ensure that all data source attributes are mapped to the same bucket line attributes.

Adding a new data source simply involves adding the list of the data source attributes and references and providing how the data source attributes and references map to the bucket line attributes. The data source definitions may be defined globally and extended by each business application module 314 based on their specificity and needs.

Similarly, the bucket line attributes also are defined. There is a global definition that is extended by each business application module 314. The defined attributes of the bucket line may be exposed in the calculation formulas as variables that may be used in formulas. If the attribute is used by the line level formula, it may refer to an aggregate (e.g. sum, min) of the actual line attribute. If the attribute is used by the calculation level formula, it may refer to the sum( ) of the actual line attribute, taking into account the dimensionality.

The merge and global filtering module 490 functions during a configuration step, while inserting a row in the filter cache table. The merge and global filtering module 490 puts the merged filters together with an AND operation, making the merged results always more restrictive than the initial filters. For the case where the merge strategy does not work, the business application module 314 may register new merge rules that may be evaluated during the configuration step.

Figure 4F:
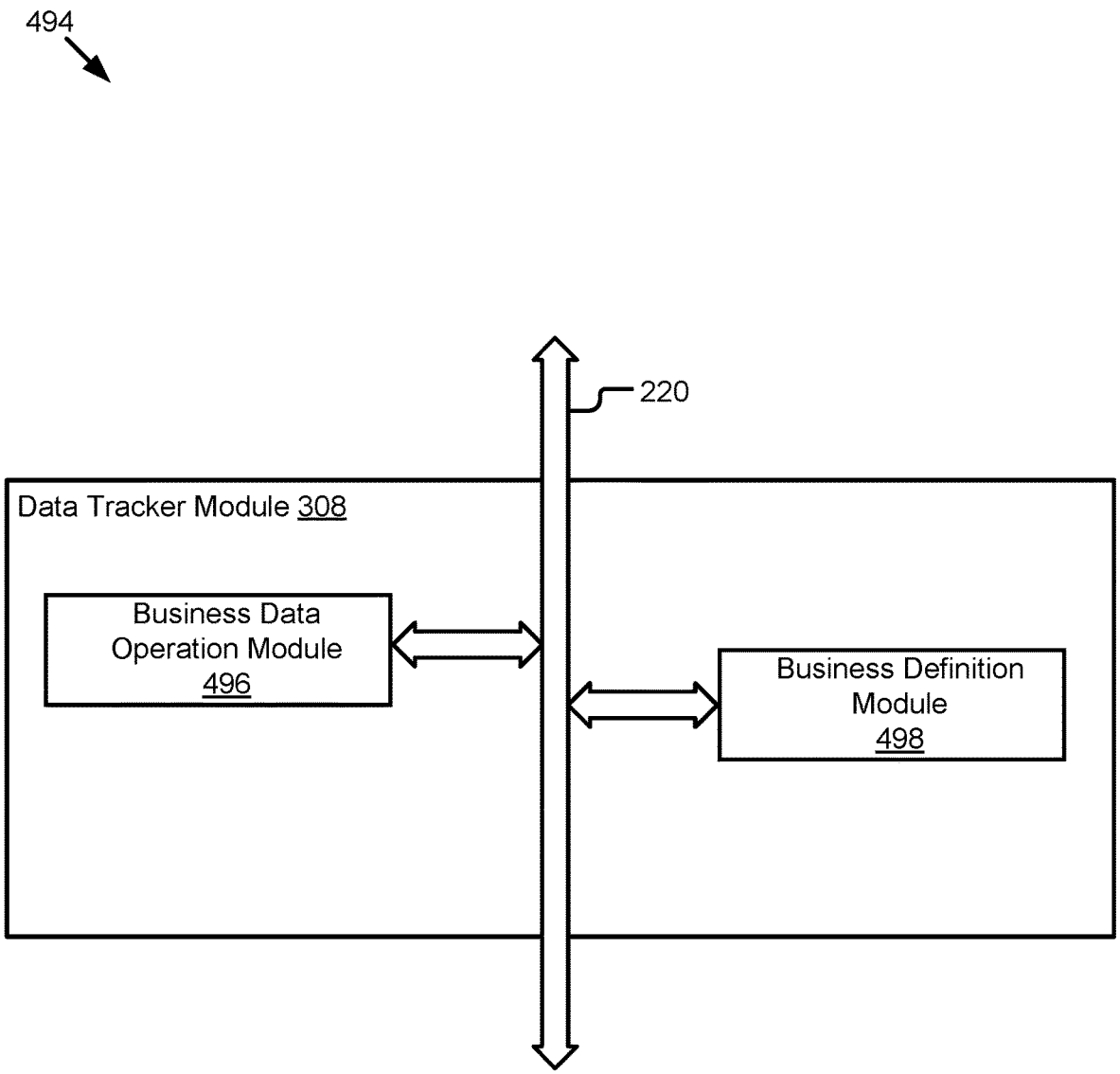
FIG. 4F is a block diagram illustrating some embodiments of the data tracker module (referenced in block 308 in FIG. 3) and its software components.

FIG. 4F is a block diagram indicated generally by reference numeral 494 illustrating the data tracker module 308. The data tracker module 308 defines a tracker for retaining the data for business tracking. A tracker may be viewed as a global generic structure, i.e., a generic structure that is not tied to any particular strategy. The data tracker module 308 includes a business data operation module 496 and a business definition module 498. Both the business data operation module 496 and the business definition module 498 are communicatively coupled to the system bus 220.

The business data operation module 496 provides data to the business definition module 498 for defining a tracker over the system bus 220. The data that is stored in the tracker follows the same structure as defined by the structure module 404.

The business definition module 498 provides the definition of a "tracker," which includes the following:
1. name: a unique name of the tracker.
2. temporal: a boolean flag that specifies if the entries in tracker are effective dated, specifying at which point, start and end dates may automatically be added to the attribute list of this tracker.
3. An ordered list of attributes:
    a. name: the name of the attribute
    b. data type: data type of the value (string, date, number, currency, percent, business object, list, enum etc.)
    c. data args: similar to how structure arguments work.
    d. isKey: defines if this attribute is a key. The set of keys will be used during the import and query mechanisms to identify specific records.
    e. isRequired: whether or not this attribute is required.
    f. default: a default value in case the value for that attribute was not specified.
    g. rules: validation rules such as making sure that a number is greater than 0.

A "tracker" has a lifecycle that determines whether the given tracker can be used and referenced within strategies. When a new tracker is created, it is given a "draft" status. Once the tracker has been defined, it may then be converted to an "active" status, at which point, data may be loaded into this tracker. A tracker definition cannot be modified when in the "active" status.

Attributes marked as "keys" may be used to determine if an imported line should update an existing one, or be inserted as a new line, and to retrieve a uniquely identifiable tracker line.

Start and end dates are used as "keys" where no overlap is allowed. A null end date is considered as 'end-of-time.' Keys are also used to retrieve data from a strategy designer formula and may be particularly helpful if the tracker keys match the calculation dimensionality.

Example Methods

Figure 5A:
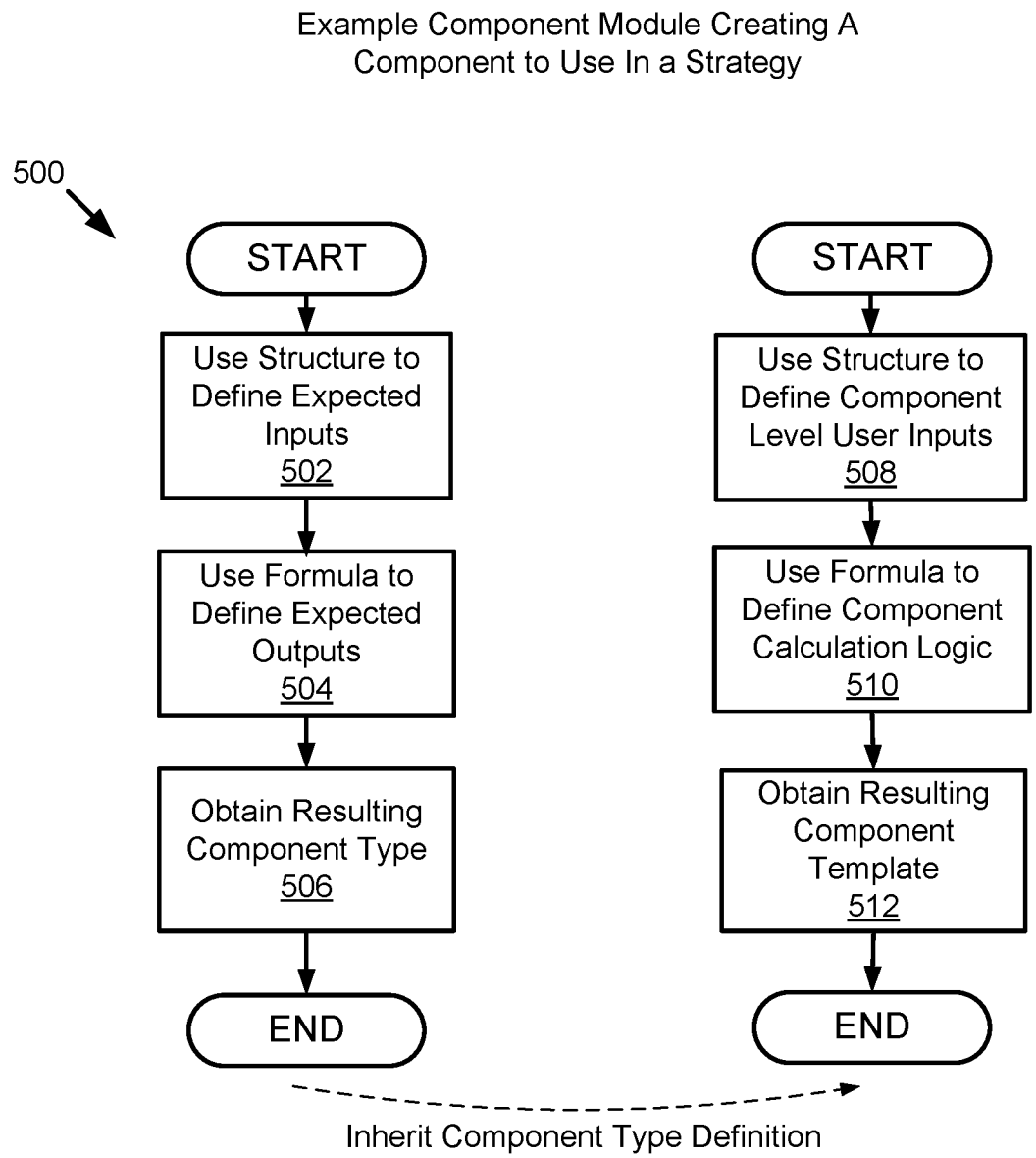
FIG. 5A is a flow chart illustrating an example method by which the component module creates a component for use in formulating a strategy.
Figure 5B:
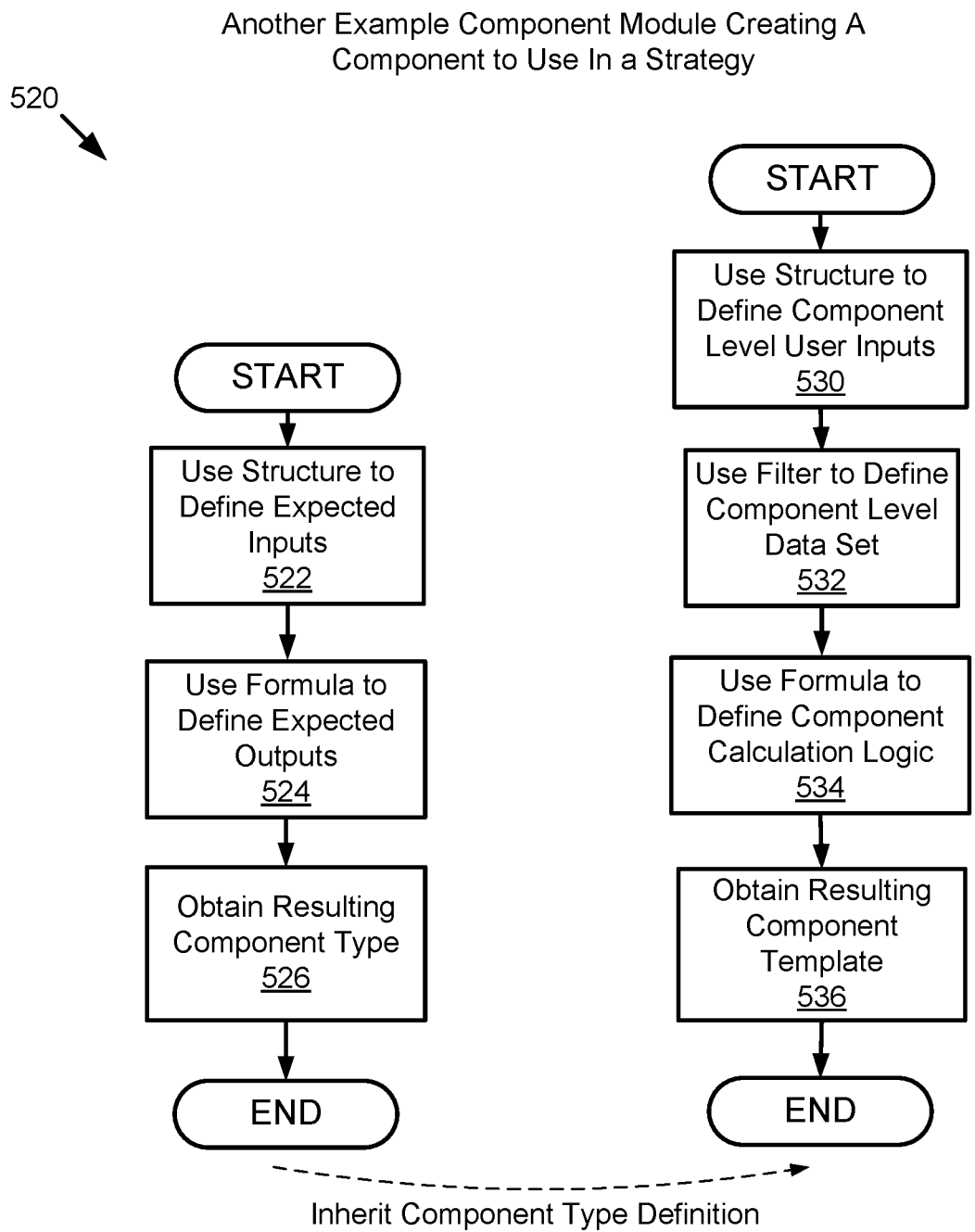
FIG. 5B is a flow chart illustrating an example method by which the component module creates a component for use in formulating a strategy.

FIG. 5A is a flow chart indicated generally by reference numeral 500, illustrating one example of a method for the component module 406 to create a component template that can be used in a strategy. The figure includes the creation of a component type and a component template based on the component type. FIG. 5B is a flow chart indicated by reference numeral 520, illustrating another example of a method for the component module 406 to create a component template. This method may be a user-driven process that is used to create new strategy instances (a user may click through the application to use it). The method to a create component type begins and proceeds to block 502, where the component module 406 defines the expected inputs based on structures. The method then proceeds to block 504, where the component module 406 defines the expected outputs based on formulas. Generally, only the formula name and result type are defined, as the expression is specific to each component template. For example, a rebate "tier qualification" component type may define a formula named "tierAttained", but not provide the formula expression. The method proceeds to block 506, where the component module 406 obtains the resulting component type.

The component module 406 creates a component template inheriting the interface definition from the component type. Specifically, at block 508, the component module 406 defines the component level user inputs from the component type. Then, the method proceeds to block 510, where the component module 406 defines the component logic based on formulas. The expressions may be set to define the exact computation associated with this component template. For example, a volume rebate "tier qualification" component template would provide an expression that calculates the "tierAttained" formula value based on the total of the sales quantities purchased. The method proceeds to block 512, where the component module 406 obtains the resulting component template.

Again, FIG. 5B is a flow chart indicated by reference numeral 520, illustrating another example of a method for the component module 406 to create a component template to use in a strategy. The method for defining a component type begins and proceeds to block 522, where the component module 406 defines the expected inputs based on structures. The method then proceeds to block 526, where the component module 406 defines the expected outputs based on formulas. The method proceeds to block 528, where the component module 406 obtains the resulting component type.

The component module 406 creates the component template inhering the interface from the component type. Specifically, at block 530, the component module 406 defines the component level user inputs based on structures. Then, the method proceeds to block 532, where the component module 406 defines the component level data set required by the calculation to calculate the expressions defined in block 534. The data sets are defined using filters. The method proceeds to block 534, at which stage the component module 406 defines the component calculation logic based on formula expressions in the same manner as block 510. The method then proceeds to block 536, where the component module 406 obtains the resulting component template.

Figure 6:
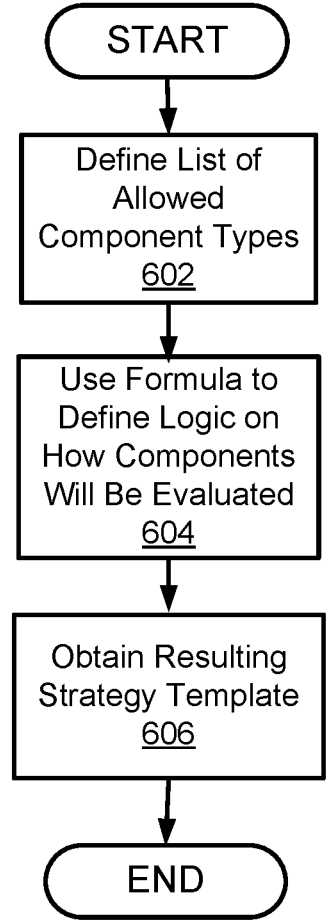
FIG. 6 is a flow chart illustrating an example method by which the strategy template module defines and creates an overall strategy template.

FIG. 6 is a flow chart illustrating one example method for defining an overall strategy template indicated generally by reference numeral 600. The method starts and proceeds to block 602 where the allowed component types are defined. The method then proceeds to block 604 by defining logic on how the components should be evaluated based on formulas. The method then proceeds to the block 606 by obtaining the resulting strategy template.

Figure 7A:
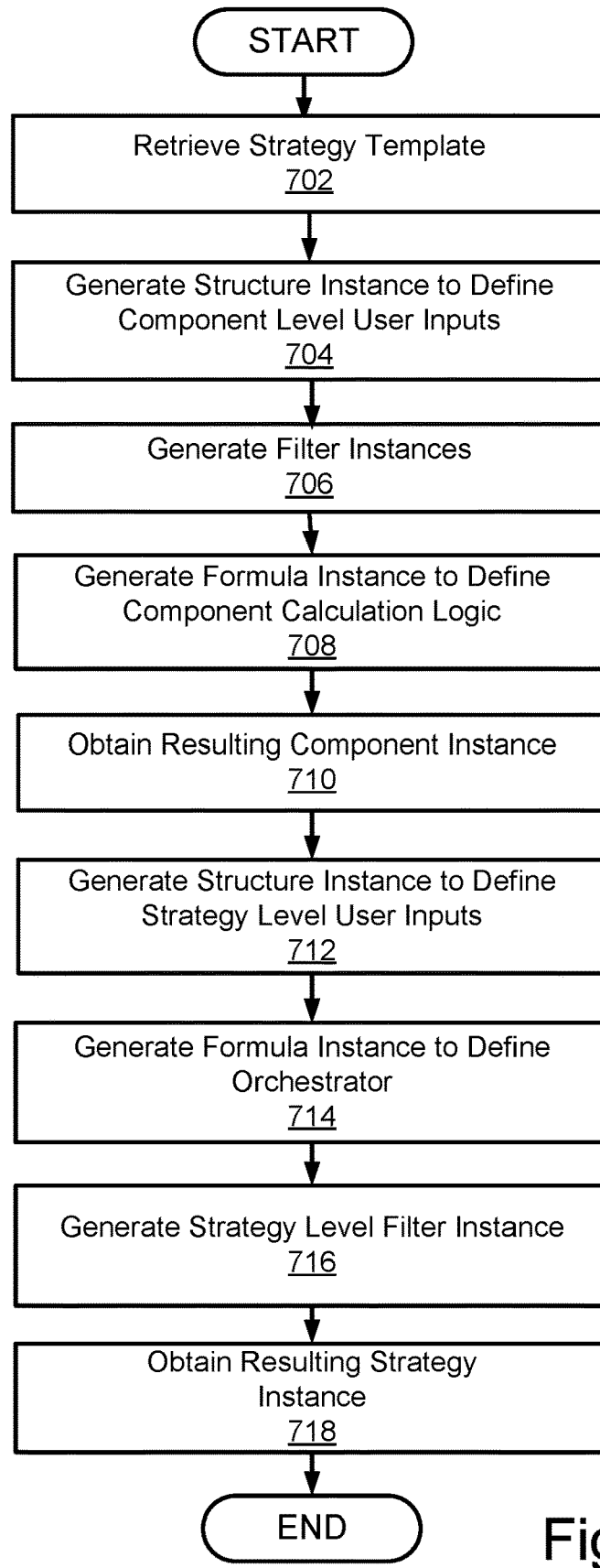
FIG. 7A is a flow chart illustrating an example method for formulating a strategy instance.

FIG. 7A is a flow chart illustrating one example method for formulating a strategy instance from a strategy template indicated generally by reference numeral 700. As one example, a user may desire to create a new strategy instance, when a user is in, for example, a contract in a contracting business application. At this point, the user may decide to add a specific strategy in the contract (e.g., percentage rebate strategy), therefore, the user may create the strategy instance in the contract from the strategy template, as illustrated in FIG. 7A. After the strategy instance has been created in the contract, the user is in the "strategy instance setup" mode, at which point the user may set the specifics for that strategy instance (e.g., set the time period for the contract, indicate what products are included, set the specific % rebate values to payout, etc.)

The method starts and proceeds to block 702, at which stage, the strategy application module 302 retrieves the strategy template used to create the new strategy instance. The method then proceeds to block 704, where the component module 406 defines the component level user inputs by generating structure instances. The method then proceeds to block 706, where the strategy instantiation module 408 generates filter instances. The method proceeds to block 708, where the component module 406 defines the component calculation logic by generating formula instances. At block 710, the strategy instantiation module 408 obtains all the component instances addressed. At block 712, the strategy instantiation module 408 defines the strategy level user inputs by generating structure instances. The method proceeds to block 714, where the method defines the orchestrator by generating formula instances. The method proceeds to block 716, where the strategy instantiation module 408 generates the strategy level filter instances. The method proceeds to block 718, where the strategy instantiation module 408 obtains the resulting strategy instance.

Figure 7B:
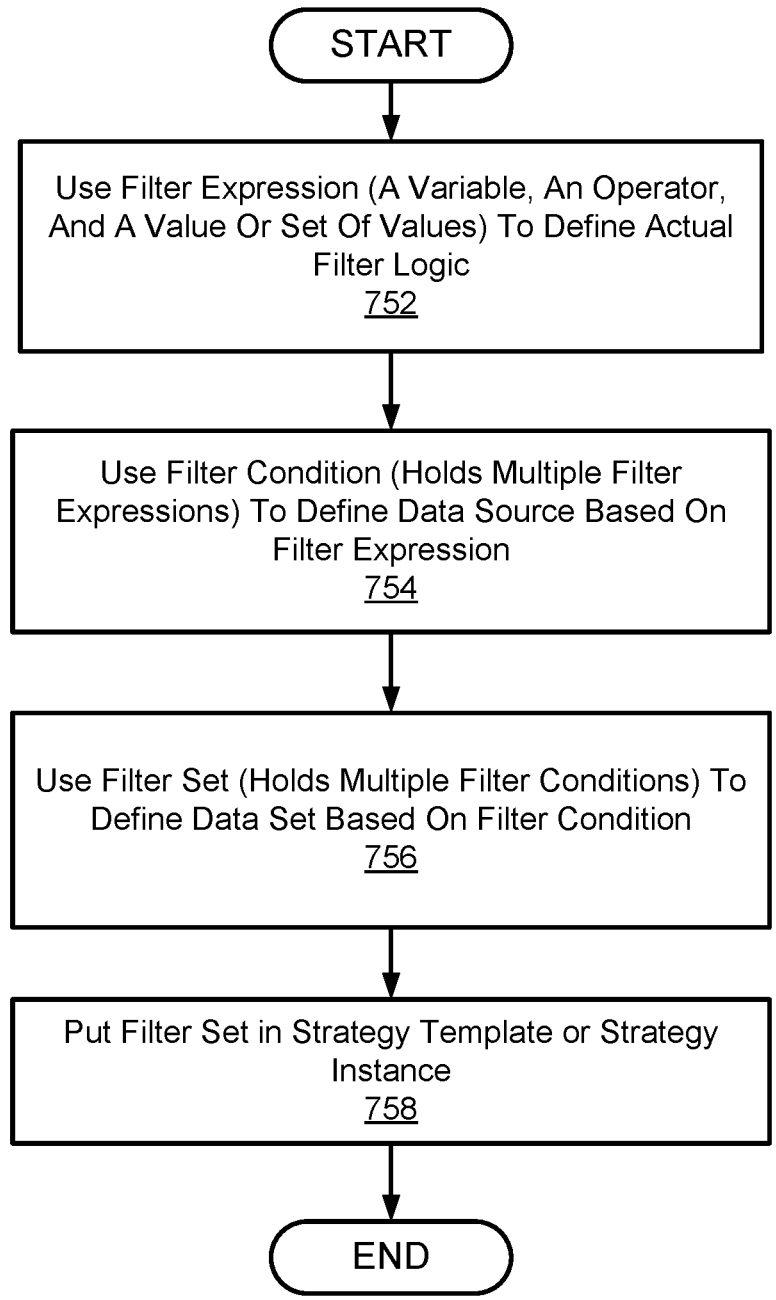
FIG. 7B is a flow chart illustrating an example filter application.

FIG. 7B is a flow chart illustrating one example method for defining a filter indicated generally by reference numeral 750. The method starts and proceeds to block 752, where the filter application 418 uses filter expressions to define individual filter criteria. The method proceeds to block 754, where the filter application 418 assembles the filter expressions into filter conditions. The method proceeds to block 756, where the filter application 418 assembles the filter conditions into filter sets that define data sets that may be used in the calculation. The method continues to block 758, at which stage, one or more operations of the filter application 418 inserts the filter set in the strategy templates or strategy instances. The filter application 418 may work against the strategy template or strategy instances.

Figure 8A:
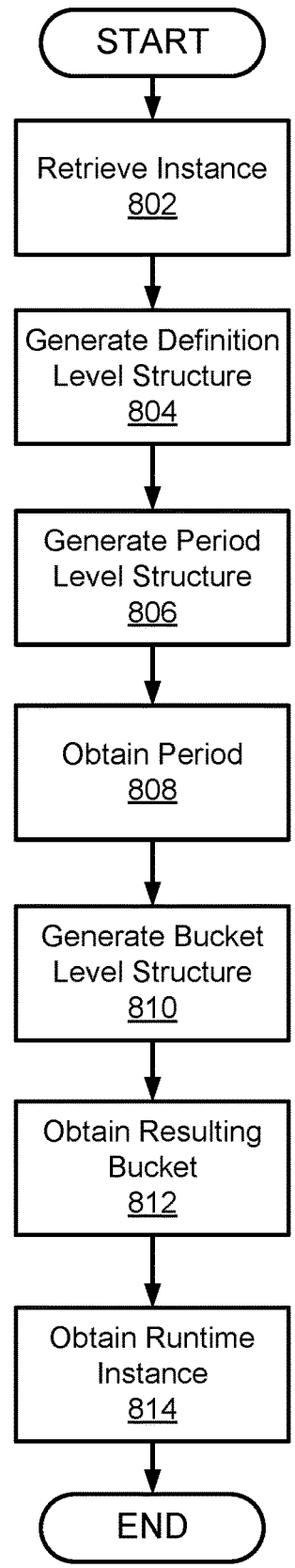
FIG. 8A is a flow chart illustrating an example method by which the strategy execution module executes a strategy.

FIG. 8A is a flow chart illustrating one example of a method for executing a strategy indicated generally by reference numeral 800. FIG. 8A illustrates when a user has completed the "strategy instance setup" phase and desires to implement, i.e, activate the strategy. The system performs one or more operations of the method described below to create the runtime instance. At this point, the strategy is ready for data to be loaded ("push" bucketing operations) or waiting for the user to explicitly trigger a calculation ("pull" bucketing operations).

The method starts and proceeds to block 802, where the strategy execution module 410 retrieves the strategy instance. The method proceeds to block 804, where the strategy execution module 410 generates the definition level structure. For each period, the method proceeds to the next block 806, at which stage, the strategy execution module 410 generates the period level structures and the method continues to the next block 808, at which stage, the strategy execution module 410 obtains the periods. For each bucket, the method proceeds to block 810, where the strategy execution module 410 generates the bucket level structures and the method proceeds to the block 812, where the strategy execution module 410 obtains the resulting buckets. The method then proceeds to block 814, where the strategy execution module 410 obtains the runtime instance.

Figure 8B:
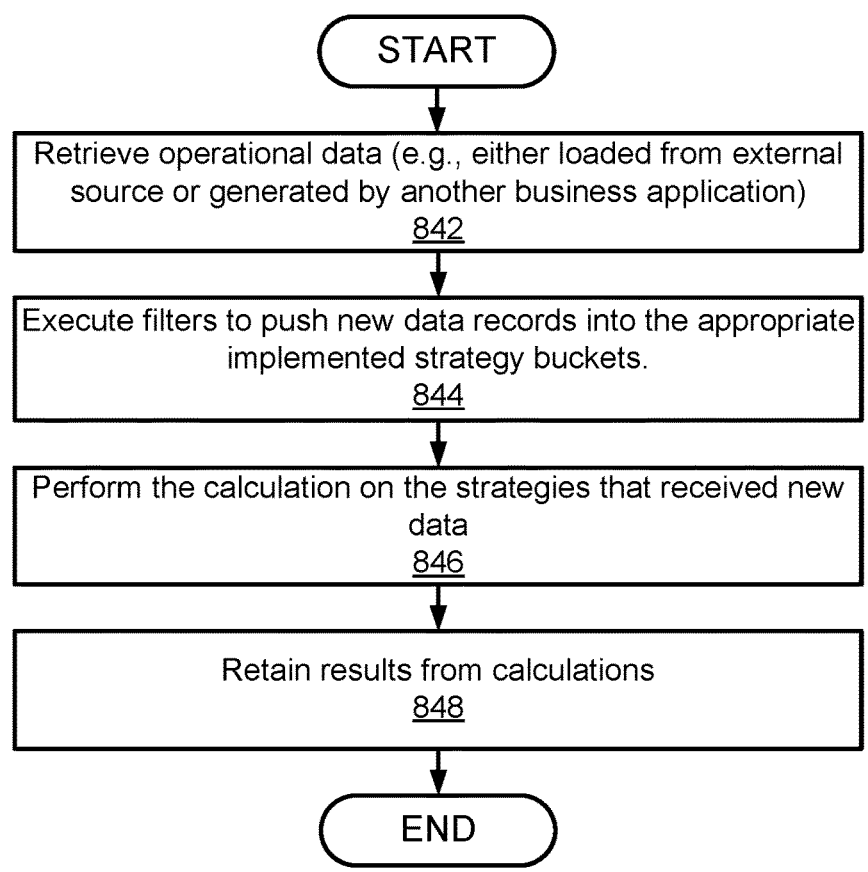
FIG. 8B is a flow chart illustrating an example method by which a runtime calculation is performed by "push" bucketing operations.

FIG. 8B is a flow chart illustrating one example for performing a runtime calculation using a "push bucketing" operation to obtain results, which is indicated generally by reference numeral 840. The method commences and proceeds to block 842 (e.g., one or more operations performed by the operational data module) by retrieving operational data (e.g., either loaded from external source or generated by another business application). The method proceeds to block 844 (e.g., one or more operations performed by the filtering module), by executing filters to "push" new data records into the appropriate implemented strategy buckets. Data records that are loaded may be used by many different implemented strategies. The method proceeds to block 846 (e.g., one or more operations performed by the calculation engine) by performing the calculation on the strategies that received new data, and then proceeds to block 848 (e.g., one or more operations performed by the calculation engine) by retaining results from the calculations.

Figure 8C:
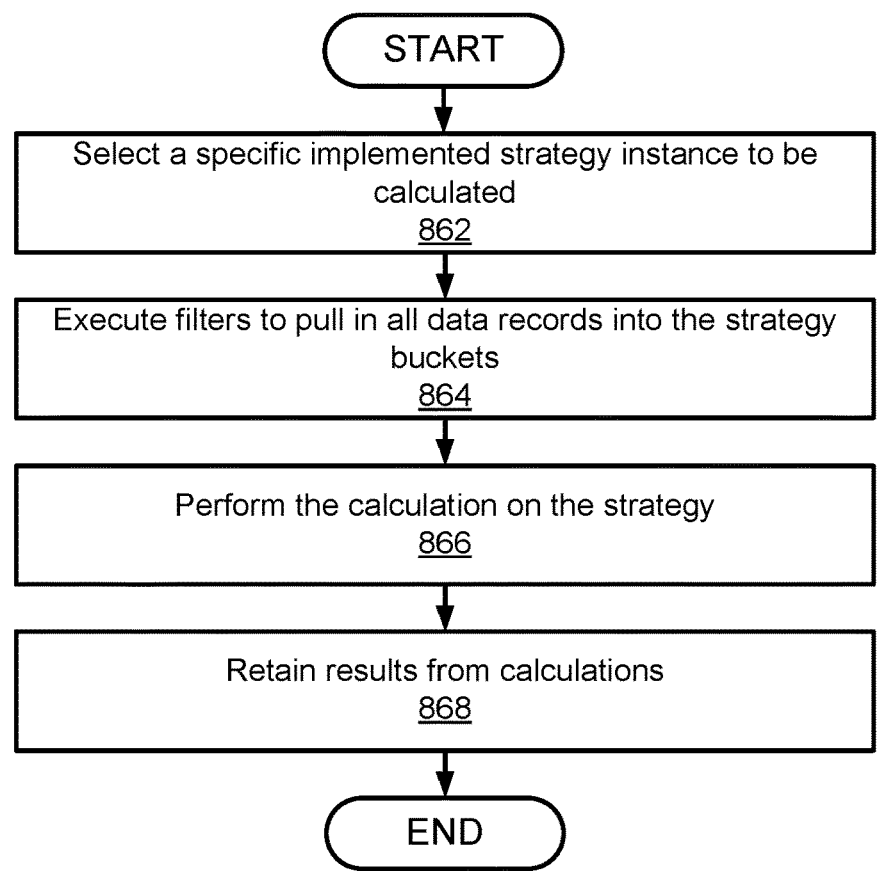
FIG. 8C is a flow chart illustrating an example method by which a runtime calculation is performed by "pull" bucketing operations.

FIG. 8C is a flow chart illustrating one example method by which a calculation is performed with a "pull" bucketing operation indicated generally by reference numeral 860. The method starts and proceeds to block 862 (e.g., one or more operations performed by the strategy application module) by selecting a specific implemented strategy instance to be calculated. The method proceeds to block 864 (e.g., one or more operations performed by the filtering module) by executing filters to "pull" in all data records into the strategy buckets. This operation may depend on the calculation mode. In a "full" mode, the method discards any previous data and pulls in all matching data based on filters. In an "incremental" mode, the method preserves all previous data in the bucket and pulls in only data that has been made available since the last execution of the calculation. In an "in-memory" mode, the method preserves all previous data and does not perform any filtering steps. The method proceeds to block 866 (e.g., one or more operations performed by the calculation engine) by performing the calculation on the strategy, and proceeds to block 868 (e.g., one or more operations performed by the calculation engine), where the method retains results from calculations.

Figure 9:
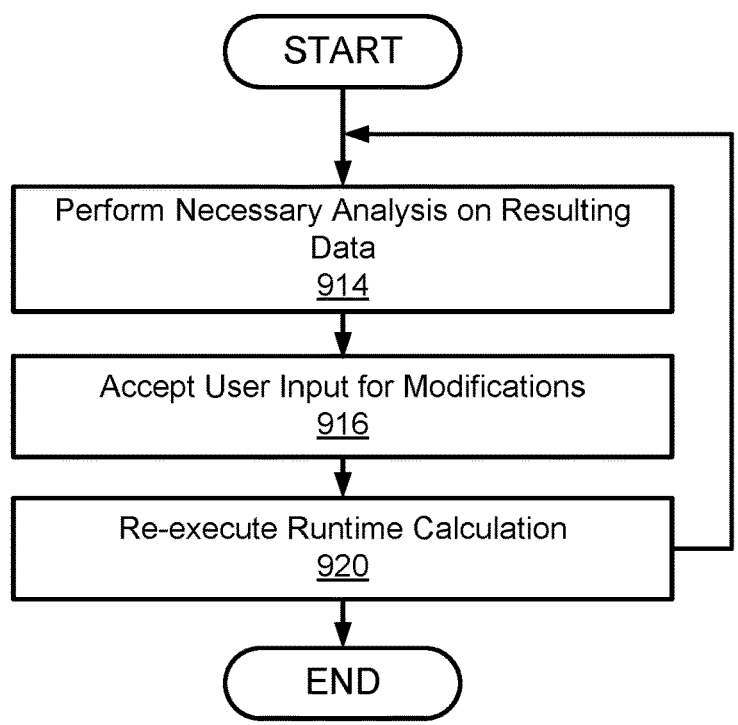
FIG. 9 is a flow chart illustrating an example general method for designing a strategy.

FIG. 9 is a flow chart illustrating one example of a general method for using a business strategy indicated generally by reference numeral 900. The method starts and proceeds to the block 914, where the end user performs any necessary analysis on the resulting data through the application module UI 454. The strategy designer unit 103*a*/103*b* supports the user analysis by providing access to all results stored in the strategy instance structures.

The method proceeds to block 916, where the calculation user interface module 312 accepts user inputs for the result modifications. The user inputs could be to include or exclude specific operational data records from the calculation. In general, after the user modifies, the user performs the calculation again as indicated by block 920 to update the results.

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method, comprising:
providing a library of different types of configurable component templates including a rebate percentage component type, a tier qualification component type, and a rebate benefit component type dependent on an attained tier input for users to customize contracts with configurable rebate strategies;

defining, using one or more computing devices and using the library of different types of configurable component templates, an object comprising a plurality of discrete components including a first discrete component and a second discrete component, each discrete component of the plurality of discrete components comprising a set of discrete formulas having a predefined order, each of the discrete formulas of the set of discrete formulas belonging to one of a plurality of different formula levels, the predefined order being defined based on the different formula levels;

initiating, using the one or more computing devices, a multi-step ordered evaluation of the first discrete component and the second discrete component by looping over each discrete formula of the set of discrete formulas of each of the first discrete component and the second discrete component to produce a result set according to the predefined order by:
passing a first result from a first formula in the first discrete component of the plurality of discrete components into a storage structure of the second discrete component of the plurality of discrete components as an input for the second discrete component to parameterize a second formula in the second discrete component;

displaying on a display device a calculation user interface;

determining, using the one or more computing devices, that an action exists that is associated with at least one formula of at least one discrete component of the plurality of discrete components;

displaying a user-selectable element corresponding to the action in the calculation user interface;

receiving, via the calculation user interface, an input from a user as a condition to move on to at least one next step of the multi-step ordered evaluation that permits the user to review an initial part of a result graph to automatically pause computation of at least a portion of the multi-step ordered evaluation until the input selecting the user-selectable element is received; and resuming computation, in response to receiving the input selecting the user-selectable element;

wherein the plurality of different formula levels includes:
a line level in which a line level formula is applied on a bucket line and a result is stored in the bucket line, an aggregate level in which an aggregate level formula is applied on the bucket line and the result is stored in a bucket structure, a calculation level in which a calculation level formula is executed in-memory against data stored in a storage structure of a discrete component associated with the calculation level formula and the result is stored in the bucket structure, and a dimension level in which a dimension level formula is calculated ahead of formulas in the line level, the aggregate level, and the calculation level;

wherein a business user creates an instance of a business strategy by editing the configurable component templates to customize a business contract with a rebate strategy that is auditable and overridable;

wherein a calculation in the aggregate level formula is translated into a SELECT SQL statement;

wherein a calculation in the line level formula is translated into an UPDATE SQL statement to allow a part of the multi-step ordered evaluation to be performed in a database associated with the multi-step ordered evaluation; and wherein the line level formula is converted into an INSERT SQL statement to add a filter during the multi-step ordered evaluation.

2. The computer-implemented method of claim 1, further comprising: storing the result set in a storage structure of a discrete component.

3. The computer-implemented method of claim 1, wherein formulas with the different formula levels have different orders of calculation, different places of calculation, or different ways to treat and store a result.

4. The computer-implemented method of claim 1, wherein each discrete component of the plurality of discrete components includes a storage structure storing data association with the multi-step ordered evaluation and a number of filters filtering data fed into the storage structure of each discrete component.

5. The computer-implemented method of claim 4, where the number of filters includes at least one or more of a filtering expression for defining actual filter logic, a filtering condition for defining a data source based on the filtering expression, and a filter set for defining a data set based on the filtering condition.

6. The computer-implemented method of claim 1, wherein the calculation user interface includes one or more user-selectable elements for a user to set up parameters in the set of discrete formulas.

7. A system comprising:
a processor; and
a memory storing instructions that, when executed, cause the system to perform operations including:
providing a library of different types of configurable component templates including a rebate percentage component type, a tier qualification component type, and a rebate benefit component type dependent on an attained tier input for users to customize contracts with configurable rebate strategies;
providing a calculation engine to implement calculations of a configured business strategy;
defining, using the library of different types of configurable component templates, an object comprising a plurality of discrete components including a first discrete component and a second discrete component, each discrete component of the plurality of discrete components comprising a set of discrete formulas having a predefined order, each discrete formula of the set of discrete formulas belonging to one of a plurality of different formula levels, the predefined order being defined based on the different formula levels;
initiating a multi-step ordered evaluation of the first discrete component and the second discrete component by looping over each discrete formula of the set of discrete formulas of each of the first discrete component and the second discrete component to produce a result set according to the predefined order by:
passing a first result from a first formula in the first discrete component of the plurality of discrete components into a storage structure of the second discrete component of the plurality of discrete components as an input for the second discrete component to parameterize a second formula in the second discrete component;

displaying on a display device a calculation user interface;
determining that an action exists that is associated with at least one formula of at least one discrete component of the plurality of discrete components;
displaying a user-selectable element corresponding to the action in the calculation user interface;
receiving, via the calculation user interface, at least one user input selecting the user-selectable element from a user as a condition to move on to at least one next step of the multi-step ordered evaluation that permits the user to review an initial part of a result graph to automatically pause computation of at least a portion of the multi-step ordered evaluation until the at least one user input selecting the user-selectable element is received; and
resuming computation, in response to receiving the at least one user input selecting the user-selectable element;
wherein the plurality of different formula levels includes a line level in which a line level formula is applied on a bucket line and a result is stored in the bucket line;
wherein a business user creates an instance of a business strategy editing the configurable component templates to customize a business contract with a rebate strategy that is auditable and overridable.

8. The system of claim 7, the instructions, when executed, cause the system to perform operations further comprising: storing the result set in a storage structure of a discrete component.

9. The system of claim 7, wherein formulas with different formula levels have different orders of calculation, different places of calculation, or different ways to treat and store a result.

10. The system of claim 7, wherein the plurality of different formula levels further includes: an aggregate level in which an aggregate level formula is applied on the bucket line and the result is stored in a bucket structure, a calculation level in which a calculation level formula is executed in-memory against data stored in a storage structure of a discrete component associated with the calculation level formula and the result is stored in the bucket structure, and a dimension level in which a dimension level formula is calculated ahead of formulas in the line level, the aggregate level, and the calculation level.

11. The system of claim 10, wherein a calculation in the line level formula is translated into an UPDATE SQL statement to allow a part of the multi-step ordered evaluation to be performed in a database associated with the multi-step ordered evaluation.

12. The system of claim 10, wherein the line level formula is converted into an INSERT SQL statement to add a filter during the multi-step ordered evaluation.

13. The system of claim 10, wherein a calculation in the aggregate level formula is translated into a SELECT SQL statement.

14. The system of claim 7, wherein each discrete component of the plurality of discrete components includes a storage structure storing data association with the multi-step ordered evaluation and a number of filters filtering data fed into the storage structure of each discrete component.

15. The system of claim 7, wherein the calculation user interface includes one or more user-selectable elements for a user to set up parameters in the set of discrete formulas.

16. A system comprising:
a distributed system architecture configured to support flexibility, scalability, and auditability, and having a plurality of servers, with each server having a processor; and
a memory storing instructions of a strategy designer unit having user interfaces to support designing, editing, and running of business strategies, that, when the instructions are executed, cause the system to perform operations including:
   providing a library of different types of configurable component templates including a rebate percentage component type, a tier qualification component type, and a rebate benefit component type dependent on an attained tier input for users to customize contracts with configurable rebate strategies;
   defining an object comprising a plurality of discrete components including a first discrete component and a second discrete component, each discrete component of the plurality of discrete components comprising a set of discrete formulas having a predefined order, each discrete formula of the set of discrete formulas belonging to one of a plurality of different formula levels, the predefined order being defined based on the different formula levels;
   initiating a multi-step ordered evaluation of the first discrete component and the second discrete component by looping over each discrete formula of the set of discrete formulas of each of the first discrete component and the second discrete component to produce a result set according to the predefined order by:
      passing a first result from a first formula in the first discrete component of the plurality of discrete components into a storage structure of the second discrete component of the plurality of discrete components as an input for the second discrete component to parameterize a second formula in the second discrete component;
   displaying on a display device a calculation user interface;
   determining that an action exists that is associated with at least one formula of at least one discrete component of the plurality of discrete components;
   displaying a user-selectable element corresponding to the action in the calculation user interface;
   receiving, via the calculation user interface, at least one user input selecting the user-selectable element from a user as a condition to move on to at least one next step of the multi-step ordered evaluation that permits the user to review an initial part of a result graph to automatically pause computation of at least a portion of the multi-step ordered evaluation until the at least one user input selecting the user-selectable element is received; and
   resuming computation, in response to receiving the at least one user input selecting the user-selectable element;
   wherein the plurality of different formula levels includes a line level in which a line level formula is applied on a bucket line and a result is stored in the bucket line; and
   wherein a business user creates an instance of a business strategy editing the configurable component templates to customize a business contract with a rebate strategy that is auditable and overridable.

17. The system of claim 16, wherein the strategy designer unit comprises a strategy application module, a filtering module, a designer user interface module, a calculation engine, a data tracker module, and a calculation user interface module.

18. The system of claim 17, wherein the strategy application module comprises a formula module, a component module, a strategy execution module, a filter application, a structure module, a strategy instantiation module, a rules application, and a lifecycle application.

19. The system of claim 16, wherein a calculation in the line level formula is translated into an UPDATE SQL statement.

20. The system of claim 16, wherein the system supports determining tiered rebates.

21. The system of claim 16, wherein the plurality of different formula levels further includes: an aggregate level in which an aggregate level formula is applied on a bucket line, the result is stored on a bucket structure, and a calculation in the aggregate level formula is translated into a SELECT SQL statement, a calculation level in which a calculation level formula is executed in-memory against data stored in a storage structure of a discrete component associated with the calculation level formula and the result stored in the bucket structure; and a dimension level in which a dimension level formula is calculated ahead of formulas in the line level, the aggregate level, and the calculation level.

22. The system of claim 21, wherein rebate formulas of any formula level are sequenced in any order based on a strategy definition.

* * * * *